United States Patent
Stewart et al.

(10) Patent No.: US 7,996,140 B2
(45) Date of Patent: Aug. 9, 2011

(54) CONFIGURABLE AUTOMOTIVE CONTROLLER

(75) Inventors: Greg Stewart, North Vancouver (CA); Francesco Borrelli, Berkeley (CA); Jaroslav Pekar, Pacov (CZ)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/886,486

(22) Filed: Sep. 20, 2010

(65) Prior Publication Data

US 2011/0010073 A1    Jan. 13, 2011

Related U.S. Application Data

(63) Continuation of application No. 12/174,910, filed on Jul. 17, 2008.

(51) Int. Cl.
*F02D 28/00* (2006.01)
*G06F 19/00* (2006.01)

(52) U.S. Cl. ....................................... 701/102

(58) Field of Classification Search ............. 701/102, 701/101, 115; 700/26, 28; 702/182–185
See application file for complete search history.

(56) References Cited

U.S. PATENT DOCUMENTS

| | | | |
|---|---|---|---|
| 4,947,334 A * | 8/1990 | Massey et al. | 701/3 |
| 5,995,895 A * | 11/1999 | Watt et al. | 701/50 |
| 6,571,191 B1 | 5/2003 | York et al. | |
| 6,965,826 B2 * | 11/2005 | Andres et al. | 701/115 |
| 7,106,866 B2 * | 9/2006 | Astorino et al. | 381/71.4 |
| 7,155,334 B1 | 12/2006 | Stewart et al. | |
| 7,165,399 B2 | 1/2007 | Stewart | |
| 7,275,374 B2 | 10/2007 | Stewart et al. | |
| 7,302,937 B2 * | 12/2007 | Ma et al. | 701/113 |
| 7,328,577 B2 | 2/2008 | Stewart et al. | |
| 7,415,389 B2 | 8/2008 | Stewart et al. | |
| 7,627,843 B2 * | 12/2009 | Dozorets et al. | 702/118 |
| 2006/0137335 A1 | 6/2006 | Stewart et al. | |
| 2006/0137340 A1 | 6/2006 | Stewart | |
| 2006/0137346 A1 | 6/2006 | Stewart et al. | |
| 2006/0137347 A1 | 6/2006 | Stewart et al. | |
| 2006/0213184 A1 | 9/2006 | Stewart | |
| 2006/0287795 A1 | 12/2006 | Samad et al. | |
| 2007/0039589 A1 | 2/2007 | Stewart et al. | |
| 2007/0101977 A1 | 5/2007 | Stewart | |
| 2007/0142932 A1 | 6/2007 | Stewart | |
| 2007/0151243 A1 | 7/2007 | Stewart | |
| 2007/0156363 A1 | 7/2007 | Stewart et al. | |

FOREIGN PATENT DOCUMENTS

EP    0301527    2/1989

OTHER PUBLICATIONS

Mayne et al., "Constrained Model Predictive Control: Stability and Optimality," Automatica, vol. 36, pp. 789-814, 2000.
Bemporad et al., "The Explicit Linear Quadradtic Regulator for Constrained Systems," Automatica, vol. 38, pp. 3-20, 2002.

\* cited by examiner

*Primary Examiner* — Hieu T Vo
(74) *Attorney, Agent, or Firm* — Seager, Tufte & Wickhem LLC

(57) ABSTRACT

An engine control unit having a one-time integration of a model predictive control template via a potentially long software process. Changes to the control structure may subsequently be made via a calibration dataset connected to the engine control unit without incurring the potentially long and laborious software process of implementing the template of other approaches in the related art.

20 Claims, 23 Drawing Sheets

CONFIGURABLE AUTOMOTIVE CONTROLLER

The present application is a continuation of U.S. patent application Ser. No. 12/174,910, filed Jul. 17, 2008, entitled "CONFIGURABLE AUTOMOTIVE CONTROLLER", which is incorporated by reference.

BACKGROUND

The invention pertains to automotive controllers and particularly to configuring such controllers.

SUMMARY

The invention is a system having a general multi-parameter model predictive controller template in an embedded engine control unit such that long software coding changes requiring large amounts of time are bypassed.

DESCRIPTION

Figure 1:
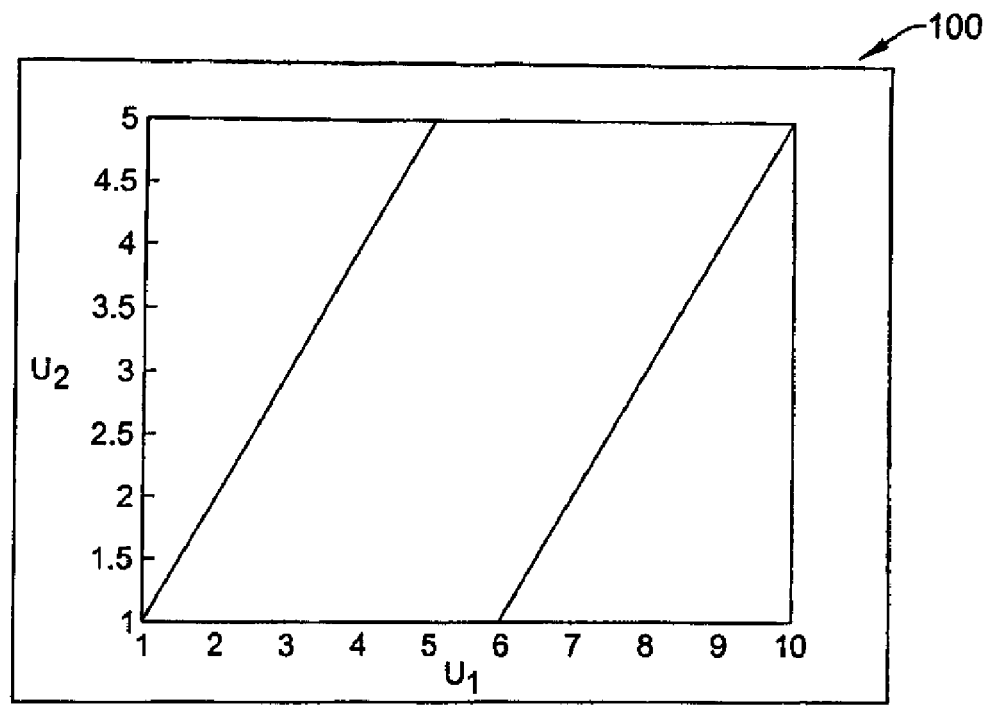
FIG. 1 illustrates an example related art graph of constraints for the optimization vector $\vec{u}(x_k)$ using multi-parametric quadratic programming algorithm.

An approach of the present invention may include the use of a model predictive control (MPC) controller on an OEM's control hardware and software platform. The approach or system may be enabled in that the controller is configurable via a calibration dataset without a requirement to enter a laborious software development process shown FIG. 12a. The present approach may permit an optimal multivariable controller to be configured strictly through populating a template with data. The term "present" used in this description may refer to the invention.

MPC control may be formulated as a general optimization problem. The control objectives may be expressed by a criterion function or a cost function and by defining system constraints. The control action might be achieved by solving the optimization problem numerically at each sampling period in cases where there exist sufficient computing resources.

The overall performance of MPC may be significantly affected by the quality and accuracy of the utilized model, which is internally utilized by MPC to predict the future trajectories based on actual measurements. A nonlinear model may describe the behavior of a system relatively well, but it is more difficult to formulate and to solve MPC based on nonlinear MPC models than the linear models. A linear model may describe the dynamic behavior of the system well in a certain neighborhood of an operating point. The parameters of the linear model might be identified by utilizing data obtained from an identification experiment. A discrete-time linear model may be expressed, for example, in a state space form as indicated in equation (1.1) as follows:

$$x_{k+1} = Ax_k + Bu_k$$

$$y_k = Cx_k + Du_k \quad (1.1)$$

where, $x \in \Re^{n_x}$ represents the system state, $u \in \Re^{n_u}$ is the system input, $y \in \Re^{n_y}$ is the system output and $A \in \Re^{n_x \times n_x}$, $B \in \Re^{n_x \times n_u}$, $C \in \Re^{n_y \times n_x}$, $D \in \Re^{n_y \times n_y}$ are system matrices. This model may be utilized to predict future system trajectories based on information related to the current system state, i.e., $x_k$. The prediction may be provided, for example, by equations (1.2) and (1.3) below.

$$\begin{bmatrix} x_{k+1} \\ x_{k+2} \\ \vdots \\ x_{k+N} \end{bmatrix} = \begin{bmatrix} A \\ A^2 \\ \vdots \\ A^N \end{bmatrix} x_k + \begin{bmatrix} B & & & \\ AB & B & & \\ \vdots & & \ddots & \\ A^{N-1}B & A^{N-2}B & \cdots & B \end{bmatrix} \begin{bmatrix} u_k \\ u_{k+1} \\ \vdots \\ u_{k+N-1} \end{bmatrix} \quad (1.2)$$

$$\begin{bmatrix} y_k \\ y_{k+1} \\ \vdots \\ y_{k+N-1} \end{bmatrix} = \begin{bmatrix} C \\ CA \\ \vdots \\ CA^{N-1} \end{bmatrix} x_k + \begin{bmatrix} D & & & \\ CB & D & & \\ \vdots & & \ddots & \\ CA^{N-2}B & \cdots & CB & D \end{bmatrix} \begin{bmatrix} u_k \\ u_{k+1} \\ \vdots \\ u_{k+N-1} \end{bmatrix} \quad (1.3)$$

Using simplified notation, equations (1.2) and (1.3) may be written as $$\vec{x} = P_x^x x_k + P_u^x \vec{u}_k \quad (1.4)$$
$$\vec{y} = P_x^y x_k + P_u^y \vec{u}_k$$

where, $$\vec{x} = \begin{bmatrix} x_{k+1} \\ x_{k+2} \\ \vdots \\ x_{k+N} \end{bmatrix}, \vec{y} = \begin{bmatrix} y_k \\ y_{k+1} \\ \vdots \\ y_{k+N-1} \end{bmatrix}, \vec{u} = \begin{bmatrix} u_k \\ u_{k+1} \\ \vdots \\ u_{k+N-1} \end{bmatrix}$$

and $P_x^x$, $P_u^x$, $P_x^y$, $P_u^y$ are corresponding matrices.

In the optimization problem, the objectives for MPC control may generally be expressed as a cost function. In linear MPC, the cost function may be quadratic with linear constraints, which leads to Quadratic Programming (QP) problems. Therefore, the final form of the cost function may be influenced by many factors. The basic form may be written as indicated, for example, in equation (1.5) below:

$$J(\vec{u}, x_k) = x_{k+N}^T Q_N x_{k+N} + \sum_{i=k+1}^{k+N-1} x_i^T Q x_i + \sum_{i=k}^{k+N-1} u_i^T R u_i \quad (1.5)$$

where, $Q \in \Re^{n_x \times n_x}$, $Q_N \in \Re^{n_x \times n_x}$ and $R \in \Re^{n_u \times n_u}$ represent weighting matrices. If the control problem is to track a given reference signal, then, the cost function may usually be written as $$J(\vec{u}, x_k) = e_{k+N}^T Q_N e_{k+N} + \sum_{i=k+1}^{k+N-1} e_i^T Q e_i + \sum_{i=k}^{k+N-1} \Delta u_i^T R \Delta u_i \quad (1.6)$$

where, $e_k = y_k - r_k$ is the tracking error, $r_k$ is the reference signal and $\Delta u_k = u_k - u_{k-1}$.

Using equation (1.4) and by introducing linear constraints, the optimization problem of MPC control may usually be transformed to the matrix form of equation (1.7) as follows:

$$\vec{u}^* = \arg\min_{\vec{u}} \left\{ \frac{1}{2} \vec{u}^T H \vec{u} + x_k^T F \vec{u} + \beta \right\} \text{ s.t } G\vec{u} \le W + V x_k \quad (1.7)$$

where, H and F represent corresponding matrices and G, W and V represent matrices defining constraints. Then, the control action at each sampling period may be obtained by solving the optimization problem of equation (1.7).

In many applications, the optimization problem might be formulated as a Quadratic Program (QP), if the model utilized by the MPC controller is linear. The QP problem as illustrated by equation (1.7) above may be solved numerically or explicitly in each sampling period for systems with relatively large sampling periods. The numerical solution, however, is not necessarily possible for applications with relatively short sampling periods or when control is to be implemented in restricted computing environments such as the embedded systems used in automotive applications. An explicit solution to QP may be as a multi-parametric quadratic programming (MP-QP) approach and may enable relatively fast-sampling periods. The explicit solution to QP may be computed in two stages, which are typically divided into an off-line part and an on-line (i.e., "online") part. The off-line part may be utilized for pre-computations in order to save on-line time in each sampling period of MPC control.

A standard MP-QP approach may transform the optimization problem of equation (1.7) by utilizing the following coordinate transformation illustrated by equation (1.8):

$$z = \vec{u} + H^{-1} F^T x_k \quad (1.8)$$

where, z represents the new optimization vector of appropriate size. The new optimization problem may generally be given by the following equation (1.9):

$$\min_z \left\{ \frac{1}{2} z^T H z + \bar{\beta} \right\} \text{ s.t. } Gz \le W + S x_k, \quad (1.9)$$
$$S = V + G H^{-1} F^T.$$

The associated Lagrange function may be defined as $$L(z, \lambda) = \frac{1}{2} z^T H z + \bar{\beta} + (Gz - W - S x_k)^T \lambda \quad (1.10)$$

where, $\lambda \in \Re^{n_c}$ represents the vector of Lagrange multipliers. Then, the optimality conditions (Karush-Kuhn-Tucker conditions) for a given problem may be expressed as follows:

$Hz + G^T \lambda = 0$, $Gz - W - S x_k \le 0$, $\lambda_{i_A}^T (G_{i_A} - W_{i_A} - S_{i_A} x_k) = 0$, $\lambda_{i_A} \le 0$. $\quad (1.11)$ where, $i_A$ represents a set of indices of all active constraints. If I is the set of indices of all constraints and $z^*(x_k)$ is the optimal solution to (1.9), then, $i_A$ may be defined by the following equation (1.12):

$$i_A(x_k) \square \{i \in I; G_i z^*(x_k) - W_i - S_i x_k = 0\} \quad (1.12)$$

Similarly, the set of inactive constraints can be defined by equation (1.13):

$$i_{NA}(x_k) \square \{i \in I; G_i z^*(x_k) - W_i - S_i x_k < 0\} \quad (1.13)$$

Using the KKT conditions of equation (1.11), for optimal solution $z^*(x_k)$ it may hold then:

$Hz^*(x_k) + G_{i_A}^T \lambda^*_{i_A}(x_k) = 0$, $G_{i_A} z^*(x_k) - W_{i_A} - S_{i_A} x_k = 0$, $G_{i_{NA}} z^*(x_k) - W_{i_{NA}} - S_{i_{NA}} x_k < 0$, $\lambda^*_{i_A}(x_k) \ge 0$, $\lambda^*_{i_{NA}}(x_k) = 0$. $\quad (1.14)$ Utilizing the first condition in equation (1.14) and assuming that matrix $H \ge 0$ is strictly positive definite, then, $$z^*(x_k) = -H^{-1} G_{i_A}^T \lambda^*_{i_A}(x_k) \quad (1.15)$$

Using equation (1.15) and second condition in (1.14), $\lambda^*_{i_A}$ may be computed by equation (1.16) below:

$$\lambda^*_{i_A}(x_k) = -(G_{i_A} H^{-1} G_{i_A}^T)^{-1}(W_{i_A} + S_{i_A} x_k) \quad (1.16)$$

and the optimal solution may be expressed as affine function of parameter vector $x_k$ $$z^*(x_k) = H^{-1} G_{i_A}^T (G_{i_A} H^{-1} G_{i_A}^T)^{-1}(W_{i_A} + S_{i_A} x_k) \quad (1.17)$$

Finally, the solution of equation (1.17) needs to satisfy constraints in equation (1.9) and Lagrange multipliers of equation (1.16) need to be nonnegative, as required by the fourth condition in equation (1.14). Both conditions may be rewritten to the form of (1.18) as follows:

$$\begin{bmatrix} GH^{-1} G_{i_{Aj}}^T (G_{i_A} H^{-1} G_{i_A}^T)^{-1} S_{i_A} - S \\ (G_{i_A} H^{-1} G_{i_A}^T)^{-1} S_{i_A} \end{bmatrix} x_k \leq \quad (1.18)$$

$$\begin{bmatrix} -GH^{-1} G_{i_{Aj}}^T (G_{i_A} H^{-1} G_{i_A}^T)^{-1} W_{i_A} + W \\ -(G_{i_A} H^{-1} G_{i_A}^T)^{-1} W_{i_A} \end{bmatrix}$$

Figure 2:
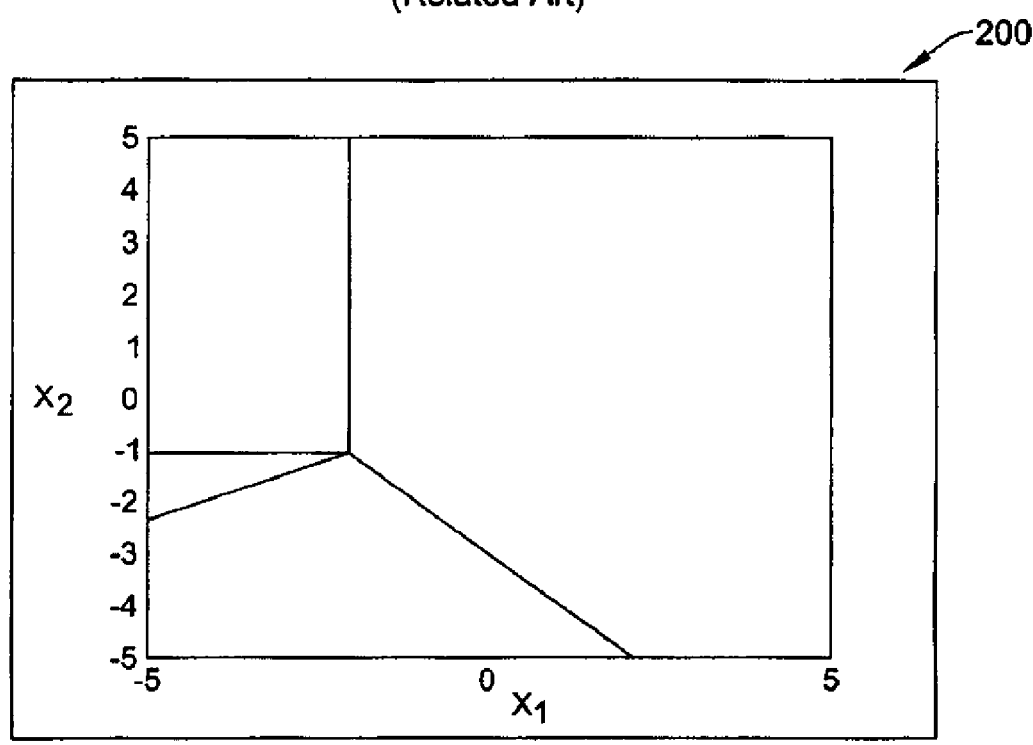
FIG. 2 illustrates an example related art graph of critical regions for a parameter vector $x_k$ utilizing a multi-parametric quadratic programming algorithm.

Referring to FIGS. 1-2, example related art graphs 100 and 200 are illustrated, which represent the constraints for optimization vector $\vec{u}(x_k)$ and critical regions for a parameter vector $x_k$ using a multi-parametric quadratic programming algorithm. The stored matrices from equation (1.8) to (1.18) may be utilized in the on-line part of the multi-parametric quadratic programming algorithm to determine the optimal solution $\vec{u}^*(x_k)$ for the given parameter vector $x_k$. As depicted in FIG. 1, system constraints for the optimization vector $\vec{u}(x_k)$ may be plotted using the stored matrices from equations (1.8) to (1.18). As illustrated in FIG. 2, the critical regions $CR_{i_A}$ associated with a given set of active constraints indexed by $i_A$ may be defined by the inequality (1.18). The optimal solution associated with $CR_{i_A}$ may be given by (1.17). The optimal MPC control action $\vec{u}^*(x_k)$ can be obtained by utilizing the transformation of equation (1.8) as follows:

$$\vec{u}^*(x_k) = -H^{-1} F^T x_k + z^*(x_k) \quad (1.19)$$

Therefore, the solution of the optimization problem (1.9) may be divided into the off-line part and on-line part.

Figure 3:
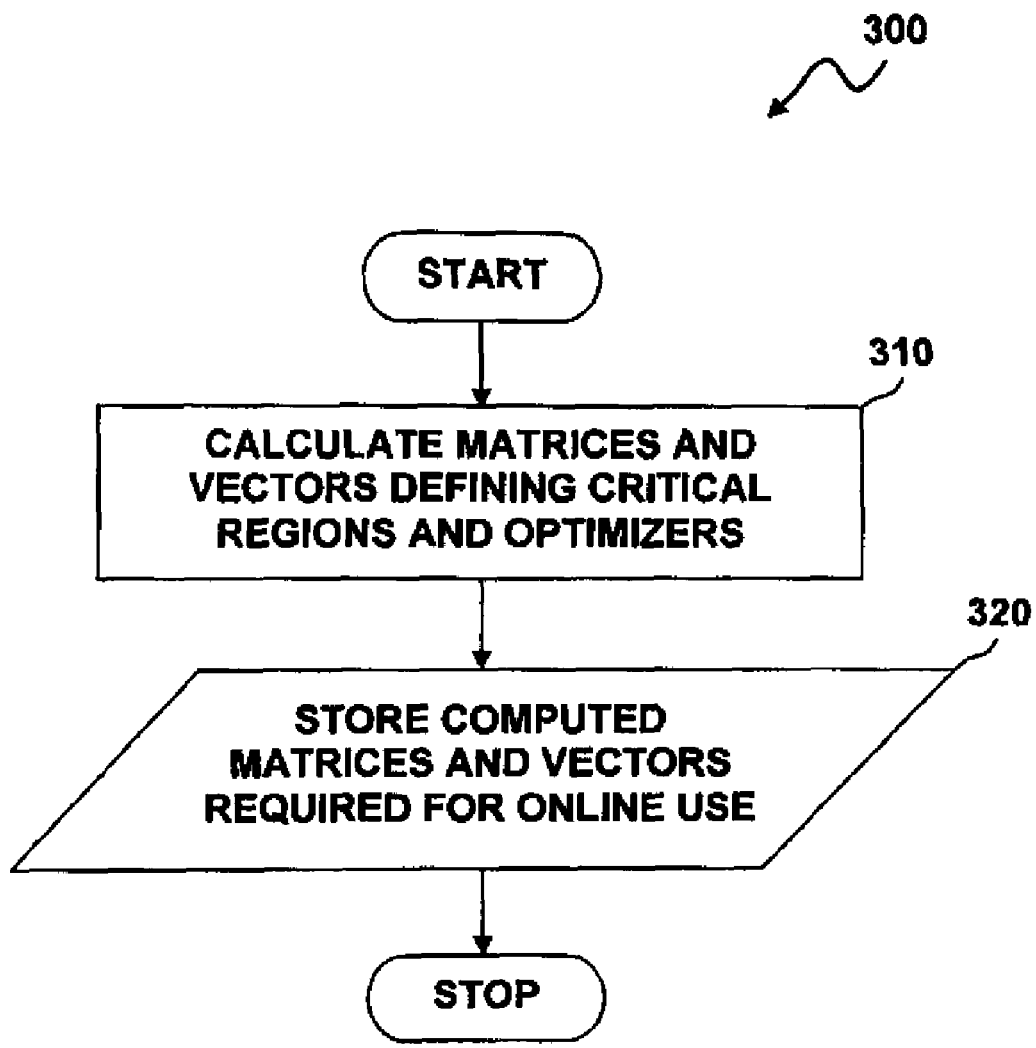
FIG. 3 illustrates a high-level flowchart depicting an off-line method for the design and implementation of optimal multivariable MPC controllers using an MP-QP algorithm.

Referring to FIG. 3, a related art flowchart depicting an off-line method 300 for the design and implementation of optimal multivariable MPC controllers utilizing an MP-QP algorithm is illustrated. As indicated at block 310, the parameter space may be partitioned so that all partitions for all feasible combinations of constraints $i_A$ (1.18) and associated affine functions for $z^*(x_k)$ (or more precisely $u^*_k(x_k)$ by using transformation (1.8)) may be computed for an optimal on-line control action. As depicted at block 320, the pre-computed critical regions $CR_{i_{Aj}}$ for j=1, 2, . . . n, where n is the total number of critical regions, and the affine functions for $u^*_k(x_k)$ are stored, where the stored matrices may be defined as follows:

$$M_1^j = \begin{bmatrix} GH^{-1} G_{i_{Aj}}^T (G_{i_{Aj}} H^{-1} G_{i_{Aj}}^T)^{-1} S_{i_{Aj}} - S \\ (G_{i_{Aj}} H^{-1} G_{i_{Aj}}^T)^{-1} S_{i_{Aj}} \end{bmatrix} \quad (1.20)$$

-continued $$m_1^j = \begin{bmatrix} -GH^{-1} G_{i_{Aj}}^T (G_{i_{Aj}} H^{-1} G_{i_{Aj}}^T)^{-1} W_{i_{Aj}} + W \\ -(G_{i_{Aj}} H^{-1} G_{i_{Aj}}^T)^{-1} W_{i_{Aj}} \end{bmatrix}$$

$$M_2^j = \left(-H^{-1} F + H^{-1} G_{i_{Aj}}^T (G_{i_{Aj}} H^{-1} G_{i_{Aj}}^T)^{-1} S_{i_{Aj}}\right)_{(1 \ldots n_u)}$$

$$m_2^j = \left(H^{-1} G_{i_{Aj}}^T (G_{i_{Aj}} H^{-1} G_{i_{Aj}}^T)^{-1} W_{i_{Aj}}\right)_{(1 \ldots n_u)}$$

where the notation $A_{(1 \ldots n)}$ is used to denote the first n rows of matrix A.

Figure 4:
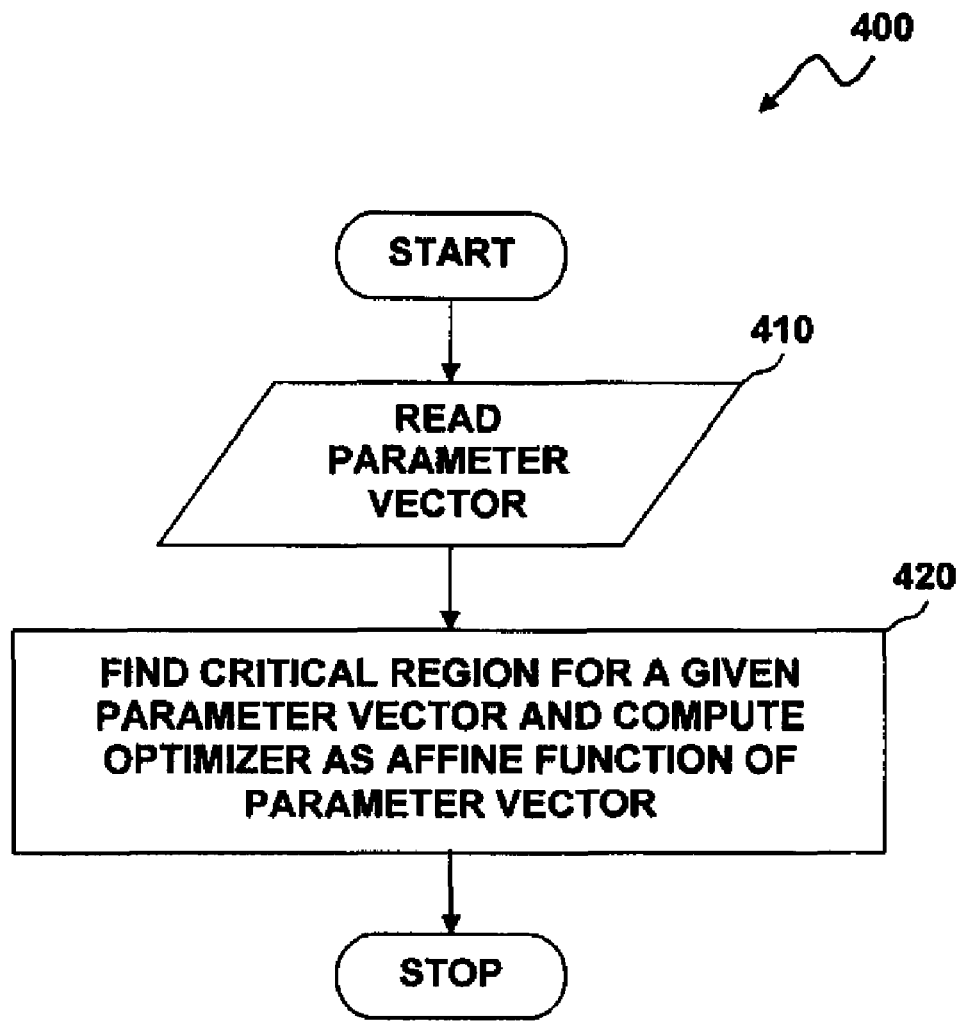
FIG. 4 illustrates a high-level flowchart illustrating an on-line method for the design and implementation of optimal multivariable MPC controllers using an MP-QP algorithm.

FIG. 4 illustrates a related art flowchart depicting an on-line method 400 for the design and implementation of optimal multivariable MPC controllers utilizing an MP-QP algorithm. As illustrated at block 410, actual value of parameter vector $x_k$ may be read in the on-line part. Next, as depicted at block 420, the active critical region $CR_{i_A}$ may be determined for the actual value of parameter vector $x_k$, and the optimal control law $u^*_k(x_k)$ may be computed by utilizing the associated affine function and the active critical region.

Figure 5:
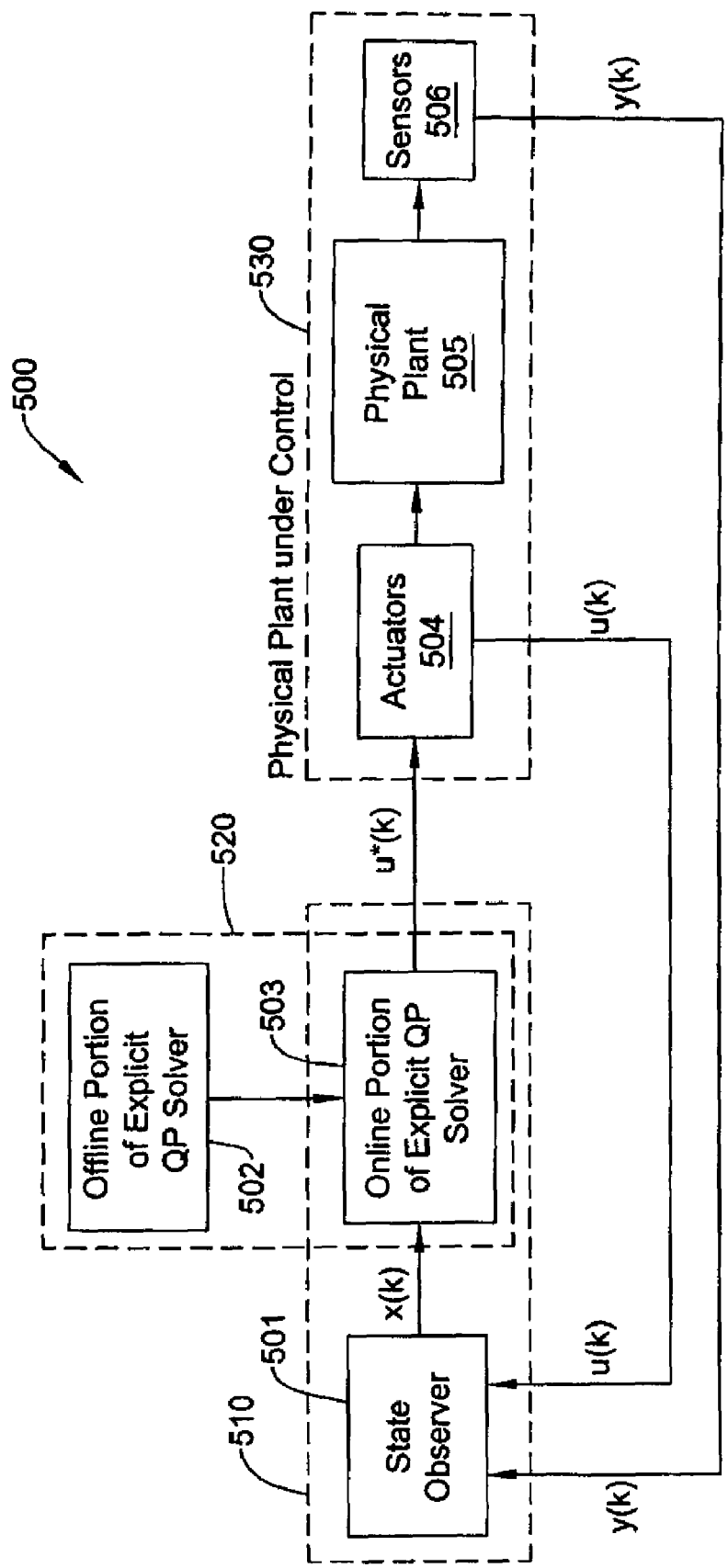
FIG. 5 illustrates a schematic diagram depicting a general control system with an optimal MPC controller utilizing an explicit QP solver.

FIG. 5 illustrates a schematic block diagram of a general control system 500 with optimal MPC controller 510 utilizing an explicit QP solver 520. The control system 500 may be adapted with MPC controller 510 for controlling, for example, an automotive system 530 by utilizing an explicit QP solver 520. MPC controller 510 may include a model of the dynamic operation process of the automotive system 530. MPC controller 510 may further provide predictive control signals to the automotive system 530, which might be subjected to constraints in control variables and measured output variables. The predictive control signals may be generated by determining the state of physical plant 505 utilizing actuators 504, sensors 506 and state observer 501 in MPC controller 510. The actuators 504 and the sensors 506 may be directly interconnected with a physical plant 505, such as an engine.

In addition, the explicit QP solver 520 may be implemented within MPC controller 510, and divided into an off-line portion 502 and an on-line portion 503. The explicit QP solver 520 may solve the optimization QP problems by using one of the optimization algorithms such as multi-parametric quadratic programming, primal-dual feasibility algorithm and graph algorithm Note that the off-line portion 502 may run once when user designs MPC controller 510 and the on-line portion 503 may run once per sample time of the real-time controller 510 at each discrete time k=0, 1, 2, . . . . The state observer 501 may generally receive present and/or past values for a number of inputs y(k) from the sensors 506 and number of control outputs u(k) of the actuators 504. The state observer 501 may produce a current set of state variables x(k) to the on-line portion 503 of the explicit QP solver 520.

The on-line portion 503 of the QP solver 520 may compute the control outputs u*(k) based on the state variables x(k) and the stored matrices in the off-line portion 502 of the QP solver 520. Therefore, MPC controller 510 may control the effect of changes in the state of the actuators 504 on each input parameter using the computed control outputs u*(k) in order to produce a desired target value in input and output parameters of the engine 505. The control outputs u*(k) may be updated constantly, intermittently or periodically for achieving optimal multivariable control of the engine 505. MPC controller 510 with the explicit QP solver 520 may be implemented as an electronic controller unit (ECU) in automotive control applications, in particular motor vehicle.

Figure 6:
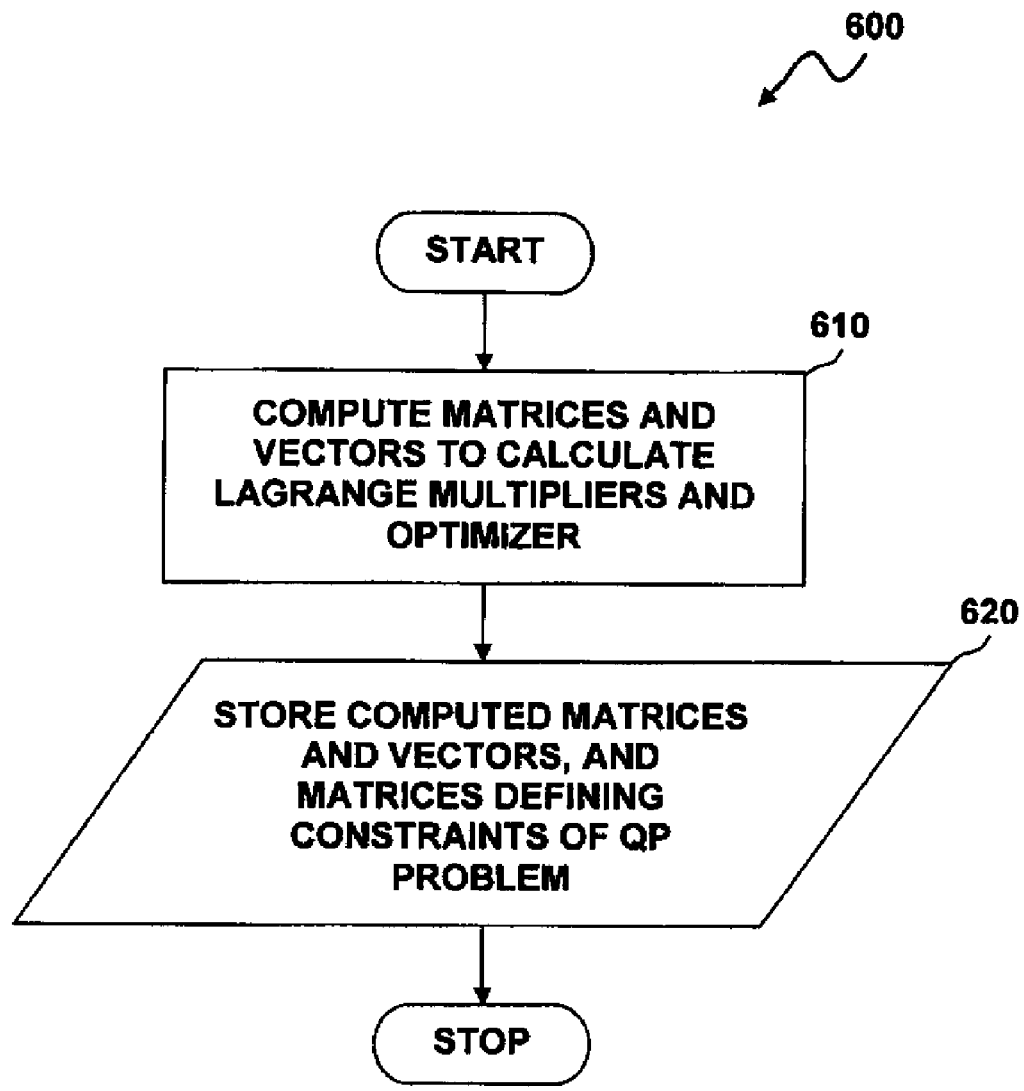
FIG. 6 illustrates a high-level flowchart illustrative of an off-line method for design and implementation of optimal multivariable MPC controllers using a primal-dual feasibility algorithm.

Referring to FIG. 6, a high-level flowchart of an off-line portion 600 for the design and implementation of optimal multivariable MPC controllers 510 using a primal-dual feasibility algorithm is illustrated. The MP-QP algorithm may be modified for producing the primal-dual feasibility algorithm, which enables one to save memory while keeping CPU utilization in the on-line part. Many of the equations may be common for both approaches. The off-line portion 600 may compute matrices and vectors for use in the on-line part.

As illustrated at block 610, matrices and vectors for all feasible combinations of active constraints in the automotive system 530 may be computed in order to calculate the Lagrange multipliers and the optimizer in the on-line part. As depicted at block 620, the computed matrices and vectors may be stored in the off-line portion 502 of the QP solver 520. The computed matrices may define the constraints of QP optimization problem. Multivariable MPC controllers 510 with the primal-dual feasibility approach can be implemented as a computer program on a specialized real-time control platform.

Figure 7:
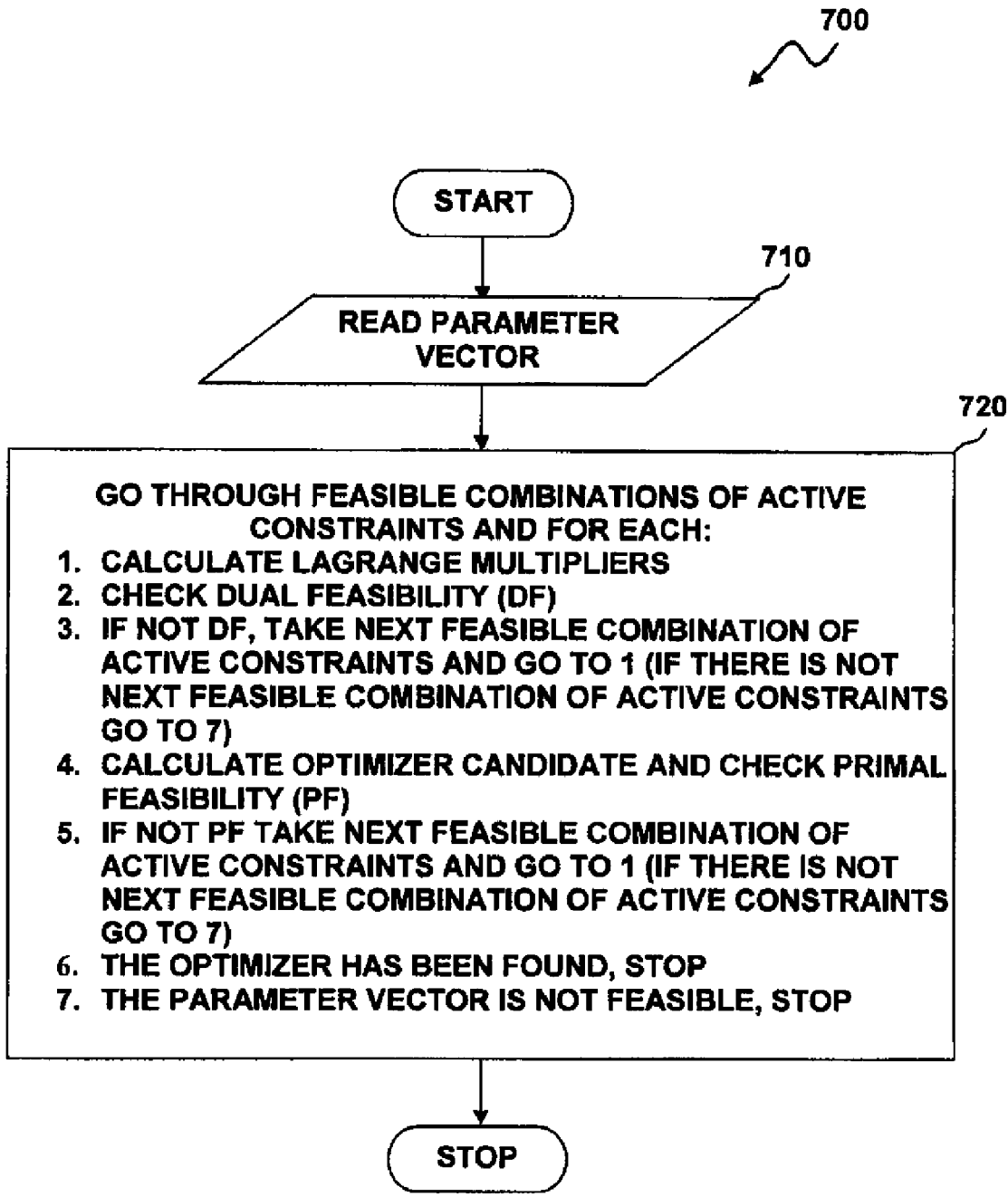
FIG. 7 illustrates a high-level flowchart illustrative of an on-line method for design and implementation of optimal multivariable MPC controllers using the primal-dual feasibility algorithm.

Referring to FIG. 7, a high-level flowchart of an on-line method 700 for design and implementation of optimal multivariable MPC controllers 510 using the primal-dual feasibility algorithm is illustrated. In the on-line part, the optimization scheme may be applied in each sampling period of the MPC control algorithm. As described at block 710, the parameter vector estimated by the state observer 501 may be read initially. As indicated thereafter at block 720, the parameter vector may be checked through all feasible combinations of the active constraints in the automotive system 530. In this checking step, initially, the Lagrange multipliers may be calculated in order to determine the dual feasibility of the parameter vector using matrices and vectors stored in the off-line portion 502 of the QP solver 520. If the parameter vector is not dual feasible, then the next feasible combination of the active constraints may be checked for dual feasibility.

Thereafter, an optimizer candidate can be calculated in order to determine the primal feasibility (PF) in the parameter vector, if the parameter vector is found to be dual-feasible. If the parameter vector is not one that leads to a primal feasible optimizer candidate, then the next feasible combination of the active constraints may be examined in order to determine the optimizer. The QP optimization problem may be solved by utilizing the optimizer. The dual-primal feasibility-checking step may then be terminated, when either the parameter vector leads to dual-primal feasibility (the solution has been found) or all feasible combinations of the active constraints have been checked without success (the solution has not been found). Such an "online" implementation of MPC controller 510 utilizing the primal-dual feasibility algorithm may reduce a search of the solution space and implementation usage of the appropriate parameter vector. Note that "online" may generally refer to the use of or access to a computer and/or computer network such as the "Internet" and/or an "Ethernet". An example of an "online" system which may be accessed and processed is system 2000 depicted and described in greater detail herein with respect to FIG. 20.

Figure 8:
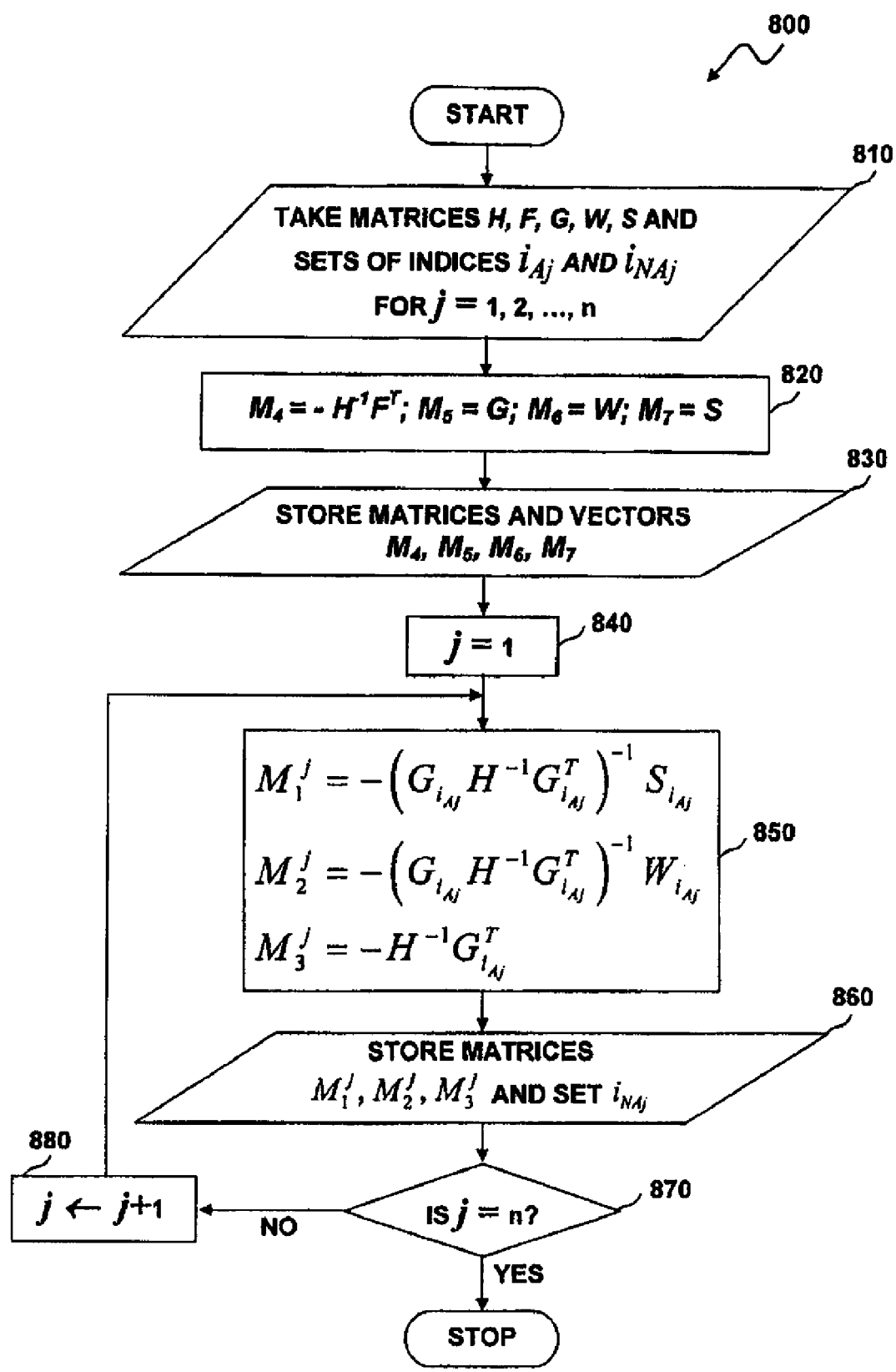
FIG. 8 illustrates a detailed flowchart illustrative of an off-line method for design and implementation of optimal multivariable MPC controllers using the primal-dual feasibility algorithm.

Referring to FIG. 8, a flowchart of an off-line portion 800 for the design and implementation of optimal multivariable MPC controllers 510 using a primal-dual feasibility algorithm is illustrated. Before compiling the primal-dual feasibility algorithm, assuming that, $i_A$ is a set of indices of active constraints and $i_{NA}$ is a set of indices of inactive constraints at optimal solution in accordance with the Karush-Kuhn-Tucker (KKT) conditions for the optimal solution as follows:

$$Hz^*(x_k)+G_{i_A}^T\lambda^*_{i_A}(x_k)=0,$$

$$G_{i_A}z^*(x_k)-W_{i_A}-S_{i_A}x_k=0,$$

$$G_{i_{NA}}z^*(x_k)-W_{i_{NA}}-S_{i_{NA}}x_k<0,$$

$$\lambda^*_{i_A}(x_k)\geqq 0,$$

$$\lambda^*_{i_{NA}}(x_k)=0. \quad (1.21)$$

The vector of optimal Lagrange multipliers may be given by $$\lambda^*_{i_A}(x_k)=-(G_{i_A}H^{-1}G_{i_A}^T)^{-1}S_{i_A}x_k-(G_{i_A}H^{-1}G_{i_A}^T)^{-1}W_{i_A} \quad (1.22)$$

Then, the optimal solution may given by $$z^*(x_k)=-H^{-1}G_{i_A}^T\lambda^*_{i_A}(x_k) \quad (1.23)$$

As illustrated at block 810, matrices and vectors for feasible combinations of active constraints may be computed for counter j=1, 2, . . . , n, where n is the total number of feasible combinations of active constraints. As depicted at block 820, the appropriate matrices may be calculated based on the corresponding constraints and matrices defining the QP problem. The computed matrices and the vectors may be stored, and then the counter may be set to j=1, as mentioned at respective blocks 830 and 840. As illustrated at block 850, the vector of Lagrange multipliers $\lambda^*_{i_A}(x_k)$ in the on-line part, i.e., matrices $-(G_{i_A}H^{-1}G_{i_A}^T)^{-1}S_{i_A}$ and $-(G_{i_A}H^{-1}G_{i_A}^T)^{-1}W_{i_A}$, may be computed. Similarly, $z^*(x_k)$ and $u^*_k(x_k)$ may be computed using the matrices $-H^{-1}G_{i_A}^T$ and $-H^{-1}F^T$. As depicted at block 860, the matrices $M_1^j$, $M_2^j$, $M_3^j$ and the sets of indices $i_{NAj}$ may be stored. The stored matrices may be denoted as $$M_1^j=-(G_{i_{Aj}}H^{-1}G_{i_{Aj}}^T)^{-1}S_{i_{Aj}}, j=1, 2, \ldots n$$

$$M_2^j=-(G_{i_{Aj}}H^{-1}G_{i_{Aj}}^T)^{-1}W_{i_{Aj}}, j=1, 2, \ldots n$$

$$M_3^j=-H^{-1}G_{i_{Aj}}^T, j=1, 2, \ldots n$$

$$M_4=(-H^{-1}F^T)_{(1..n_u)}$$

$$M_5=G$$

$$M_6=W$$

$$M_7=S \quad (1.24)$$

As indicated at block 870, the counter j=1 may be checked for the set of indices to terminate the process, if not so, then the process may be repeated from step 850 for counter j=j+1, as displayed at block 880, in order to compute and store matrices and vectors for all feasible combinations of active constraints.

Figure 9:
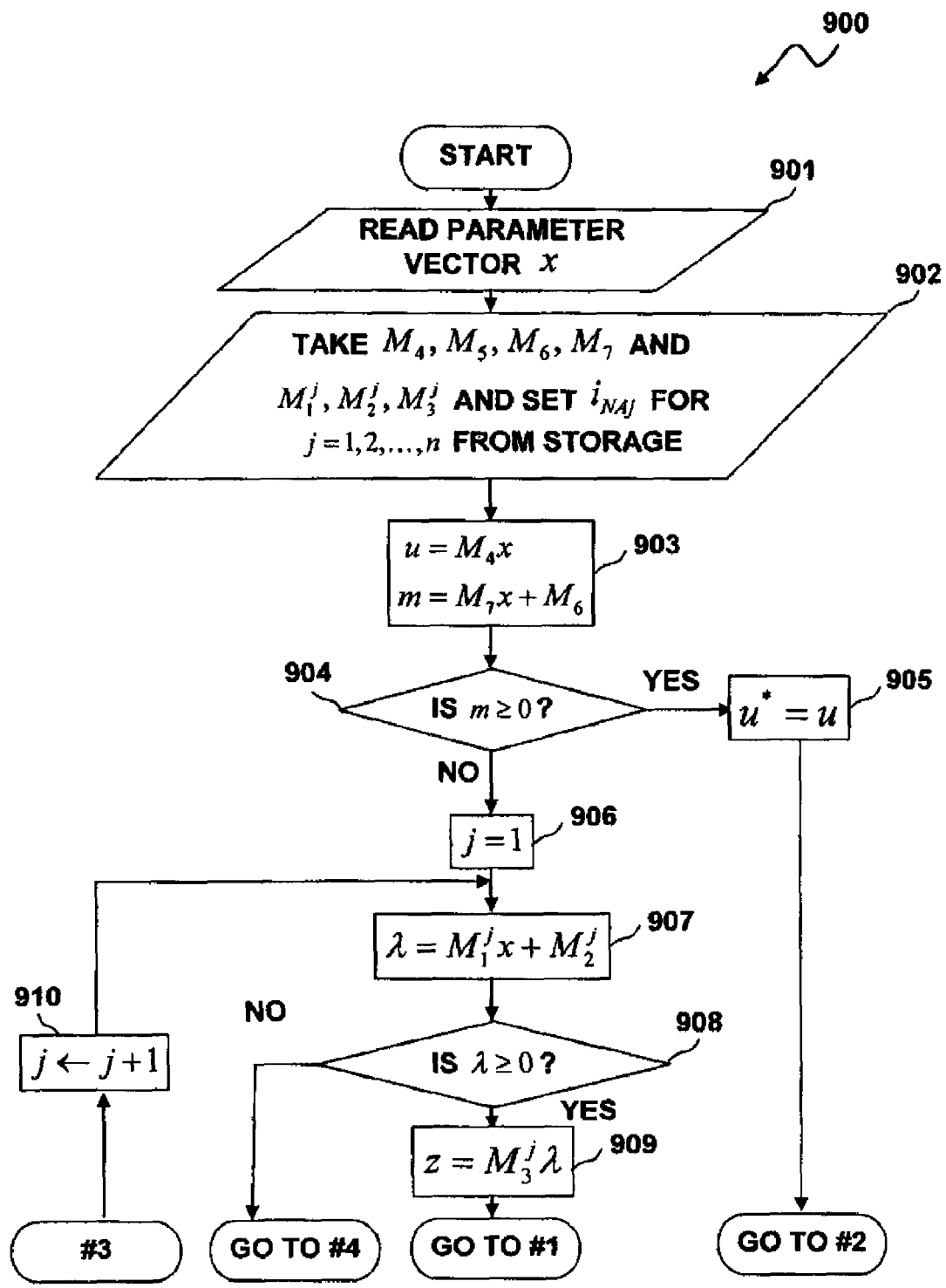
FIG. 9A and FIG. 9B illustrate a detailed flowchart illustrative of an on-line method for design and implementation of optimal multivariable MPC controllers using the primal-dual feasibility algorithm.
Figure 9A:
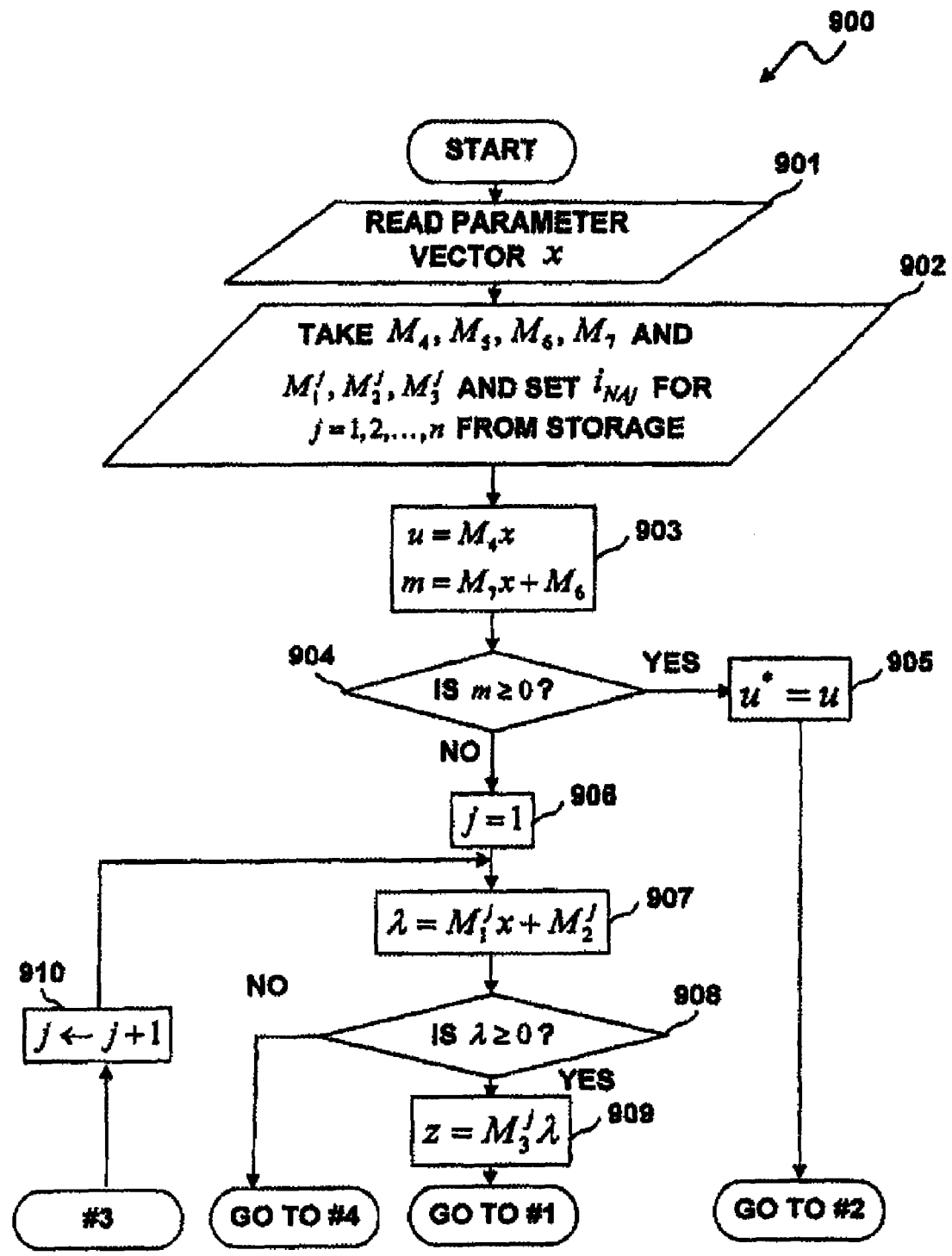
Figure 9B:
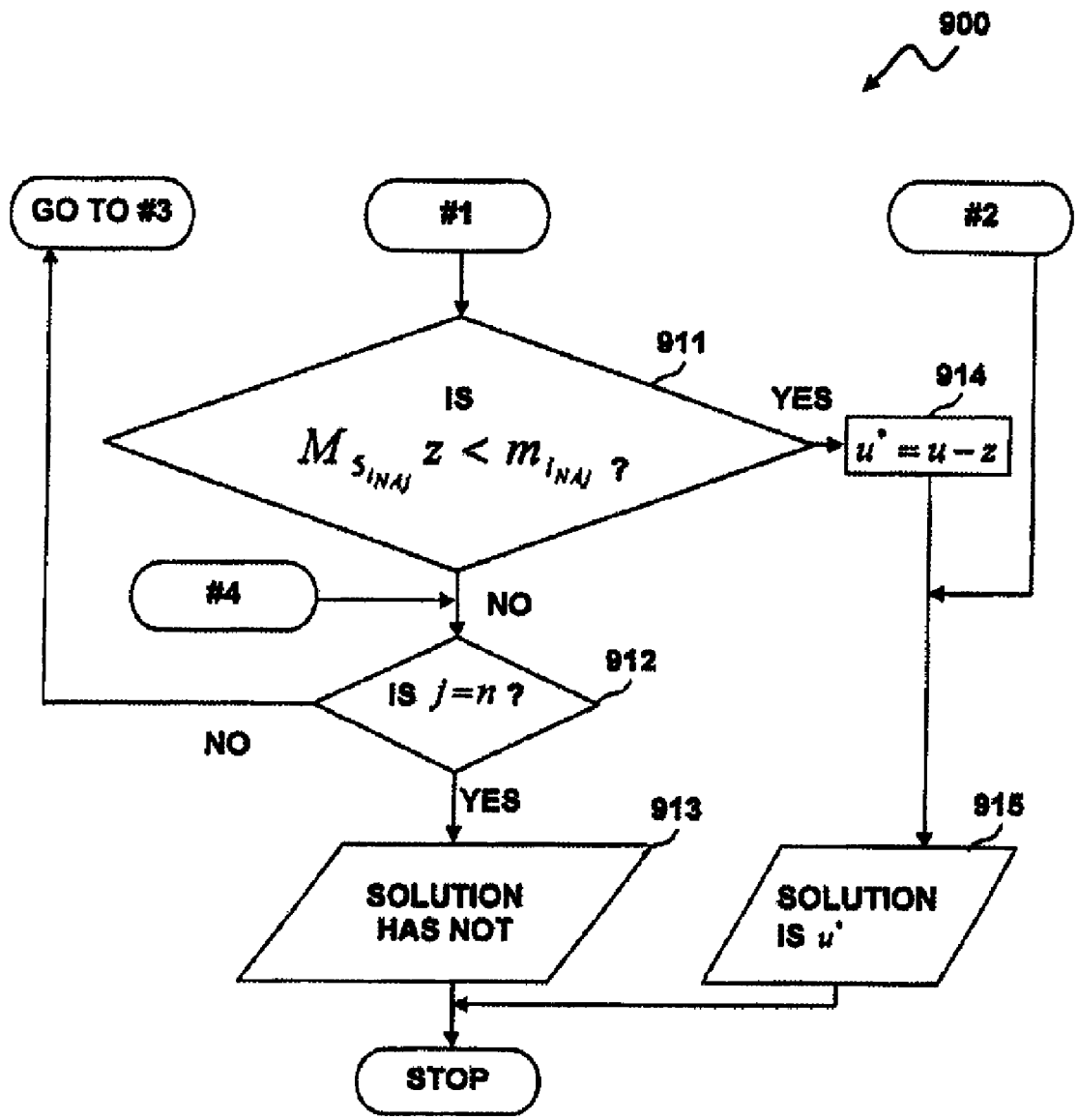

Referring to FIGS. 9A and 9B, a high-level flowchart of an on-line method 900 for the design and implementation of optimal multivariable MPC controllers 510 using the primal-dual feasibility algorithm is illustrated. In the on-line part, an optimization scheme may be processed for each sampling period of the MPC control algorithm. As illustrated at block 901, the parameter vector $x_k$ may be measured or estimated, for example by the state observer 501. As depicted thereafter at block 902, the matrices $M_4$, $M_5$, $M_6$, $M_7$, $M_1^j$, $M_2^j$, $M_3^j$ and the sets of indices $i_{NAj}$ stored in the off-line portion 502 of the QP solver 520 may be retrieved. As indicated next at block 903, vector $u_k(x_k)=M_4x_k$ and vector $m=M_7x_k+M_6$ may be computed to find m, as displayed at block 904. Then, as illustrated at block 905, the optimal control action may be given by $u^*_k(x_k)=u_k(x_k)$ to inform that the optimal solution is found. Next, the operations may continue to the process depicted at block 915.

Thereafter, as indicated at block 906, if m≧0 is not true, set counter j=1 to denote the jth set of indices of the active constraints by $i_{Aj}$ and jth set of indices of the inactive constraints by $i_{NAj}$. As indicated at block 907, vector $\lambda_{i_{Aj}}(x_k)=M_1^jx_k+M_2^j$ may be computed to check the dual feasibility, i.e., $\lambda_{i_{Aj}}(x_k)\geqq 0$, as illustrated at block 908. If vector $\lambda_{i_{Aj}}(x_k))$ is dual feasible, then the operations may proceed to block 909 or else go to block 912. Inform that the optimal solution is not found, if j<n is not true in the block 912, as indicated at respective blocks 912 and 913. As illustrated at block 909, the vector $z(x_k)=M_3^j \lambda_{i_{Aj}}(x_k)$ may be computed to check the primal feasibility, i.e., $$M_{5_{(i_{NAj})}} z(x_k) < m_{i_{NAj}},$$

as shown in block 911. If vector $z(x_k)$ is primal feasible, then set $z^*(x_k)=z(x_k)$ and compute the optimal control action as $u^*_k(x_k)=u_k(x_k)-(z^*(x_k))_{(1..n_u)}$, as depicted at block 914. Finally, as illustrated at block 915, the vector $u^*$ may be informed as the optimal solution.

For example, according to equation (1.7), the optimization problem may be defined as equation (1.25) by assuming $n_u=2$, $n_x=2$.

$$H = \begin{bmatrix} 2 & 0 \\ 0 & 1 \end{bmatrix}, F = \begin{bmatrix} 1 & 0 \\ 0 & 1 \end{bmatrix}, \beta = 0, G = \begin{bmatrix} -1 & 1 \\ 1 & -1 \\ 0 & 1 \\ 0 & -1 \end{bmatrix}, \quad (1.25)$$

$$W = \begin{bmatrix} 0 \\ 5 \\ 5 \\ -1 \end{bmatrix}, V = \begin{bmatrix} 0 & 0 \\ 0 & 0 \\ 0 & 0 \\ 0 & 0 \end{bmatrix}$$

and the parameter vector $x_k$ is constrained by $$\begin{bmatrix} -5 \\ -5 \end{bmatrix} \leq \begin{bmatrix} 1 & 0 \\ 0 & 1 \end{bmatrix} x_k \leq \begin{bmatrix} 5 \\ 5 \end{bmatrix} \quad (1.26)$$

Then, the number of feasible combinations of active constraints may be n=3 (a case with all inactive constraints is not included), and the feasible combinations may be {(1), (4), (1,4)}. The following matrices (see (1.24)) may be stored according to the off-line part of the control algorithm, $$M_1^1 = [0.3333 \quad -0.6667], M_2^1 = 0, M_3^1 = \begin{bmatrix} 0.5 \\ -1 \end{bmatrix} \quad (1.27)$$

$$M_1^2 = [0 \quad 1], M_2^2 = 1, M_3^2 = \begin{bmatrix} 0 \\ 1 \end{bmatrix} \quad (1.28)$$

$$M_1^3 = \begin{bmatrix} 1 & 0 \\ 1 & 1 \end{bmatrix}, M_2^3 = \begin{bmatrix} 2 \\ 3 \end{bmatrix}, M_3^3 = \begin{bmatrix} 0.5 & 0 \\ -1 & 1 \end{bmatrix} \quad (1.29)$$

$$M_4 = \begin{bmatrix} -0.5 & 0 \\ 0 & -1 \end{bmatrix} \quad (1.30)$$

$$M_5 = \begin{bmatrix} -1 & 1 \\ 1 & -1 \\ 0 & 1 \\ 0 & -1 \end{bmatrix}, M_6 = \begin{bmatrix} 0 \\ 5 \\ 5 \\ -1 \end{bmatrix}, M_7 = \begin{bmatrix} -0.5 & 1 \\ 0.5 & -1 \\ 0 & 1 \\ 0 & -1 \end{bmatrix} \quad (1.31)$$

The stored matrices from (1.27) to (1.31) may be utilized in the on-line part of the primal-dual feasibility algorithm to find the optimal solution for the given parameter vector $x_k$.

Figure 10:
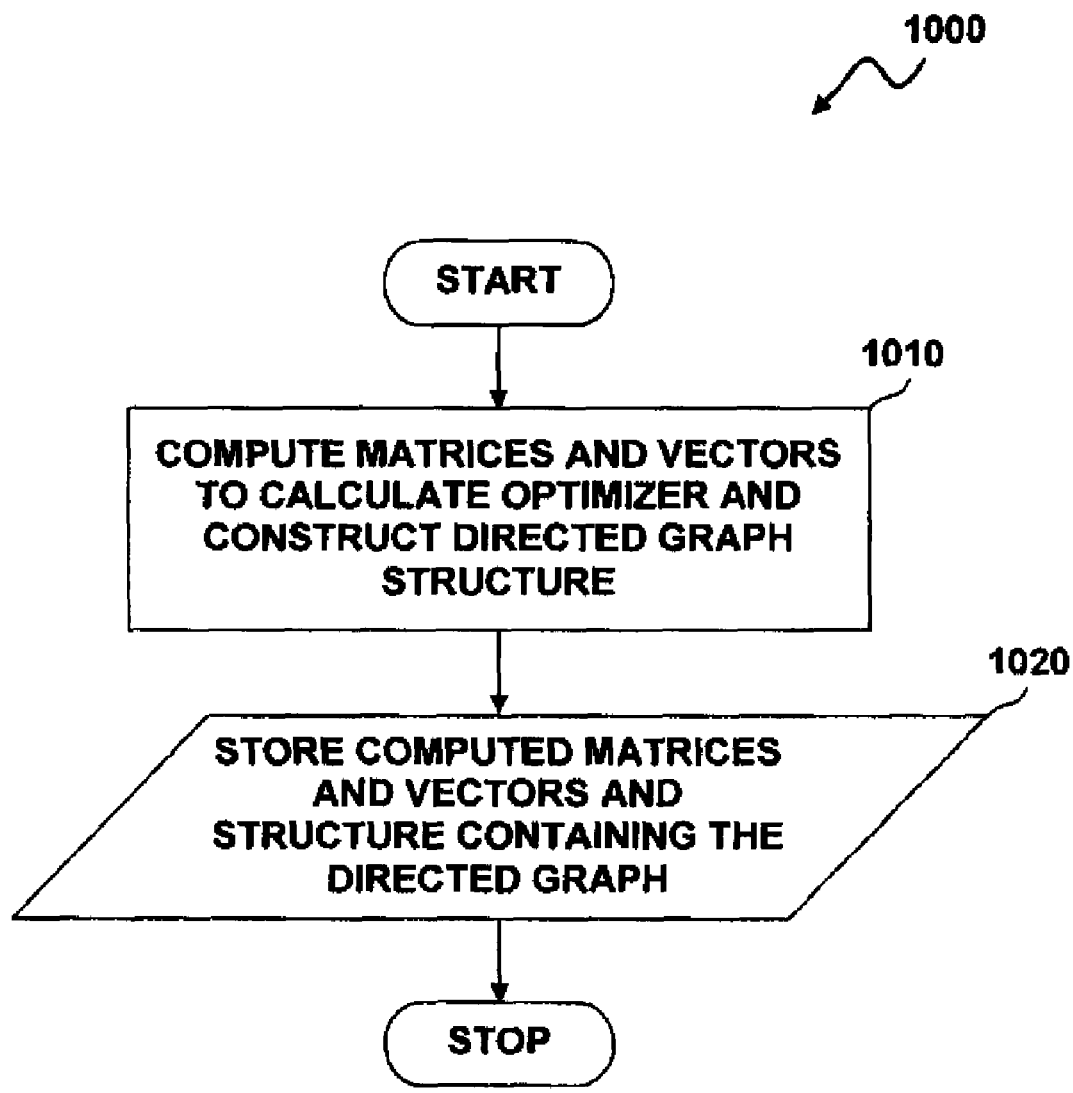
FIG. 10 illustrates a high-level flowchart illustrative of an off-line method for design and implementation of optimal multivariable MPC controllers using a graph algorithm.

Referring to FIG. 10, a high-level flowchart of an off-line portion 1000 for the design and implementation of optimal multivariable MPC controllers 510 utilizing a graph algorithm is illustrated. The graph approach methodology may be another approach to solve the optimization problem of the form (1.9). In this graph approach, a directed graph structure may be constructed and stored in the off-line part. Then, the graph may be utilized in the on-line part of the algorithm to find all primal-feasible candidates for optimizer in an efficient way. The graph may be constructed to minimize the number of feasible candidates for optimizer. The optimizer may be determined within the set of all feasible candidates utilizing the cost function defining the optimization problem. The optimizer may be the candidate that leads to the lowest value of the cost function.

Assume that the optimization problem exhibits n feasible combinations of active constraints, i.e., $i_{Aj}$ for counters j= 1, 2, ... n, with associated affine functions to calculate the optimizer for a given parameter vector x, i.e., $$u^*_j(x_k)=M_2^j x_k + m_2^j, j=1, 2, \ldots, n \quad (1.32)$$

In the off-line method 1000, matrices defining affine functions for all feasible combinations of active constraints $i_{Aj}$ for j=1, 2, ..., n, where n is the total number of feasible combinations of active constraints, may be determined as $$M_2^j = (-H^{-1}F + H^{-1}G_{i_{Aj}}^T (G_{i_{Aj}} H^{-1} G_{i_{Aj}}^T)^{-1} S_{i_{Aj}})_{(1..n_u)}$$

$$m_2^j = (H^{-1} G_{i_{Aj}}^T (G_{i_{Aj}} H^{-1} G_{i_{Aj}}^T)^{-1} W_{i_{Aj}})_{(1..n_u)} \quad (1.33)$$

As illustrated at block 1010, the associated matrices $M_2^j$ and vectors $m_2^j$, i.e., (1.33) may be computed to calculate the optimizer, and also the directed graph structure may be prepared. As depicted at block 1020, the computed vectors and matrices H, F, G, W and V and the directed graph structure may be stored, where the matrices G, W and V generally define the constraints of the original optimization problem.

Figure 11:
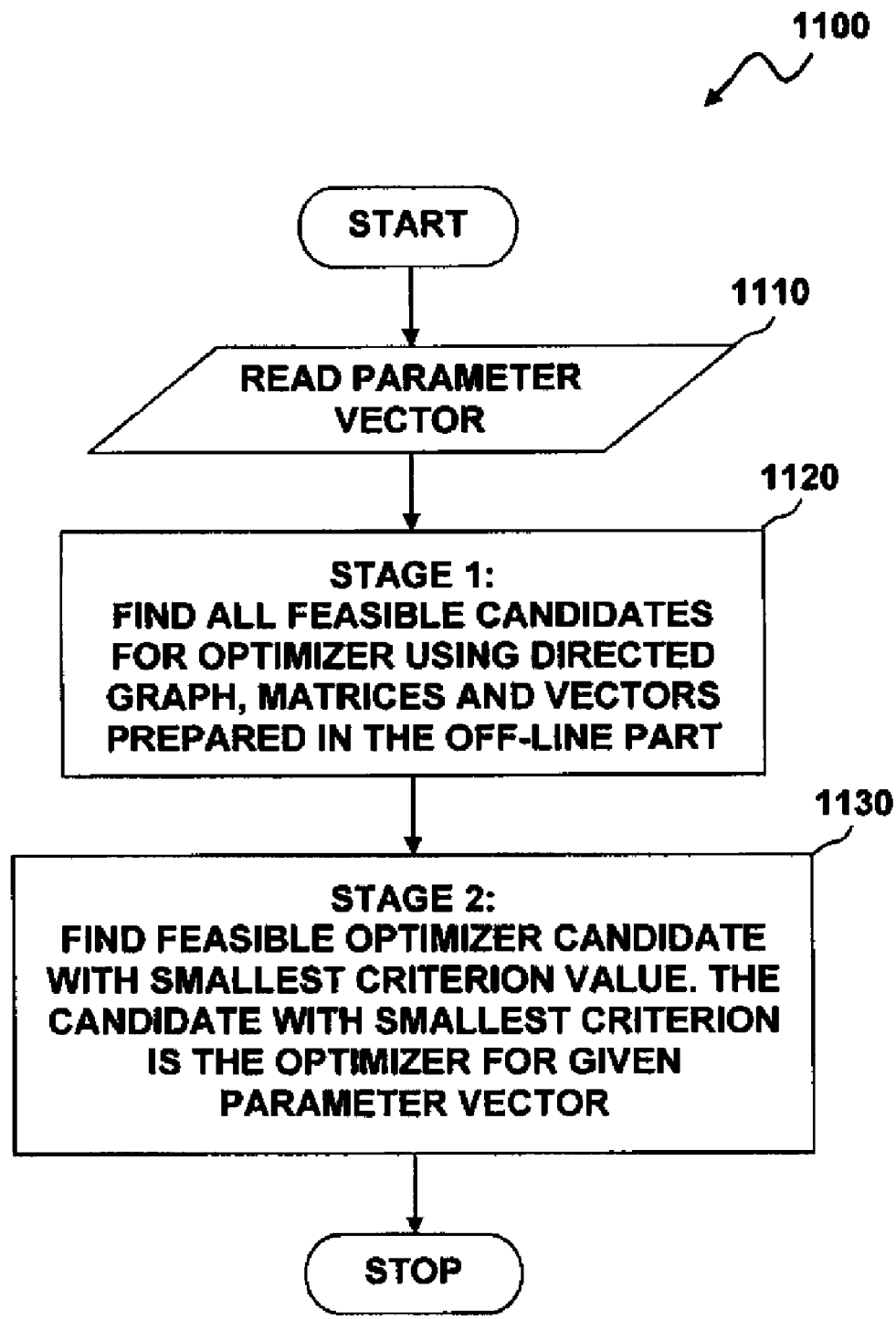
FIG. 11 illustrates a high-level flowchart illustrative of an on-line method for design and implementation of optimal multivariable MPC controllers using the graph algorithm.

Referring to FIG. 11, a flowchart of an on-line method 1100 for the design and implementation of optimal multivariable MPC controllers 510 using the graph algorithm is illustrated. In the on-line method 1100, the optimization scheme may be performed in each sampling period of MPC control algorithm. As illustrated at block 1110, the parameter vector may be provided by the state observer 501. As depicted at block 1120, all feasible candidates for optimizer may be found by performing breath-first search using the directed graph, the matrices and the vectors prepared in the off-line part.

Especially, the candidates for optimizer may be calculated for each node in the breath-first search using equation (1.32), i.e., $u_k^j(x_k)$. Then, the feasibility of the candidate may be checked by utilizing $Gu_k^j(x_k) \leq W+Vx_k$. If the candidate is feasible, the node may be marked as "feasible" and all successors of the node may be recursively marked as "not-interesting". Similarly, if the candidate is not feasible, the node may be marked as "not-interesting". As specified at block 1130, a value of criterion function, i.e., $J_j(x_k)=u_k^j(x_k)^T H u_k^j(x_k)+x_k^T F u_k^j(x_k)$, may be computed for all feasible candidates for optimizer in order to find the feasible optimizer candidate with smallest criterion value. The optimal control action $u^*_k(x_k)$ may be equal to the candidate with smallest value of cost function $J_j(x_k)$. The optimizer candidate with the smallest criterion value may be utilized as the optimal solution for the given parameter vector $x_k$.

Figure 12A:
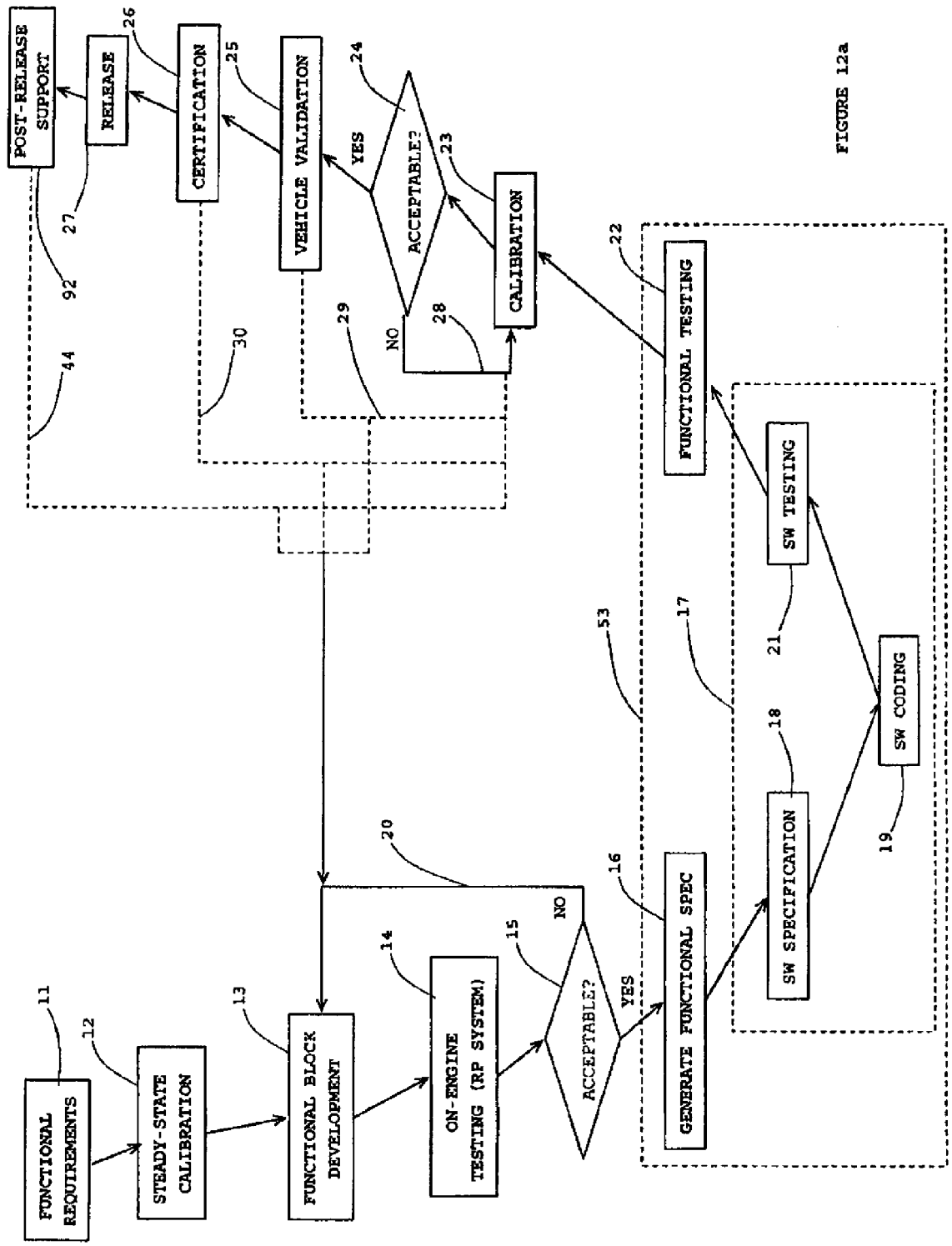
FIG. 12a is a diagram of an automotive control development approach.
Figure 13:
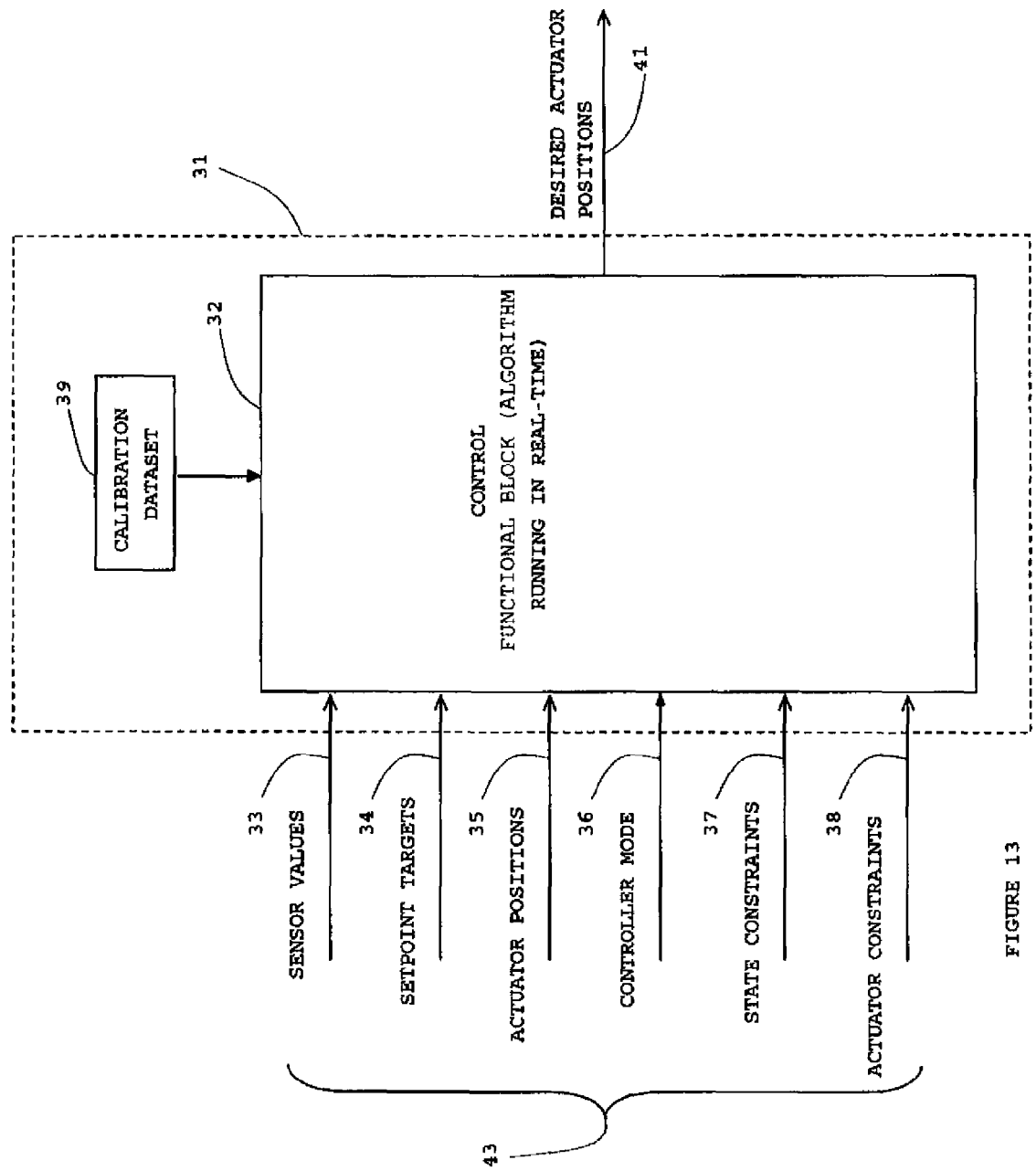
FIG. 13 is a diagram of a control functional block in an automotive engine control unit.
Figure 17:
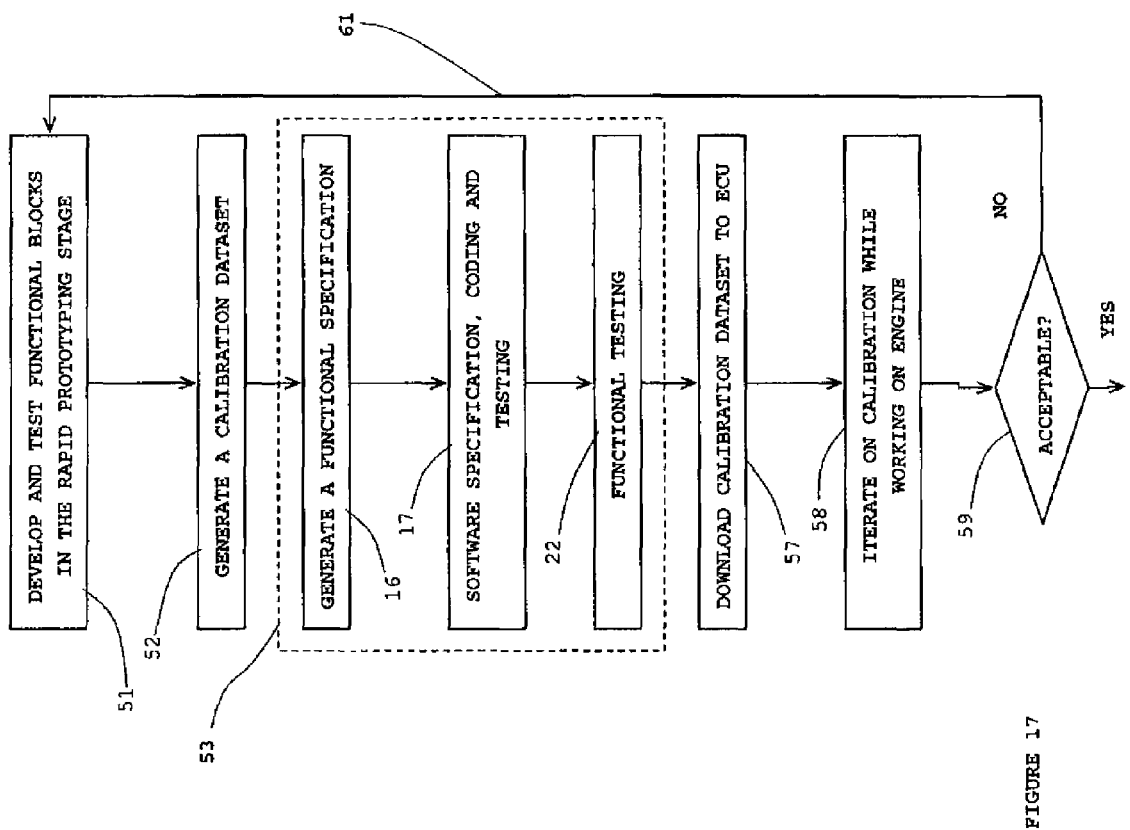
FIG. 17 is a diagram of a development process for a control functional block.

Previous automotive control approaches may follow a V-model flow diagram in FIG. 12a which includes a laborious process in a set 17 of steps. An implementation of a subcontroller with other approaches may be in terms of lookup tables and fixed control elements, such as PIDs. Examples of such approaches are shown in FIGS. 12a, 13 and 17. Making changes in these approaches may require changes to a hard-coded algorithm and thus a return to functional block development.

In contrast, the present approach may involve a one-time integration of a software template via a (perhaps potentially rather long) software process. Subsequent structure changes may then be straightforward and relatively quick via a calibration dataset. The present approach may include an implementation of a model predictive control (MPC) controller which can be configurable through the calibration dataset. Various other kinds of MPCs may be implemented. The MPC may be a control technique which enables a user to specify measurements, setpoints, constraints, actuators and so forth, in a generic way. It may appear unusual to be able to use MPC in a computationally tight environment such as an embedded automotive engine control unit (ECU). One may use a multiparameter optimization technique in order to perform large computations offline and code only a small amount of computations in the online code.

There may be several ways to implement a multiparameter MPC in an automotive environment. Some of these ways, however, do not appear to result in the development time benefits of the present approach. The present approach may implement a general MPC template in the embedded ECU such that the long periods needed for software coding changes are significantly reduced or avoided for implementations in the system. Various kinds of MPCs may be implemented in ECUs.

The MPC may be described in a paper entitled, "Constrained Model Predictive Control: Stability and Optimality", by Mayne, D. Q., et al., in *Automatica* 36 (2000), 789-814. Multiparameter techniques for implementing MPC, particularly in limited computing environments, may be described in a paper entitled, "The Explicit Linear Quadratic Regulator for Constrained Systems", by Bemporad, A., et al., in *Automatica* 38 (2002), 3-20.

Additional information which may be relevant to the present description may be in the following patent documents. Patents may include: U.S. Pat. No. 7,155,334, issued Dec. 26, 2006; U.S. Pat. No. 7,165,399, issued Jan. 23, 2007; U.S. Pat. No. 7,275,374, issued Oct. 2, 2007; and U.S. Pat. No. 7,328,577, issued Feb. 12, 2008; all of which are hereby incorporated by reference. Patent applications may include: U.S. patent application Ser. No. 11/024,531, filed Dec. 29, 2004; U.S. patent application Ser. No. 11/025,221, filed Dec. 29, 2004; U.S. patent application Ser. No. 11/025,563, filed Dec. 29, 2004; U.S. patent application Ser. No. 10/907,209, filed Mar. 24, 2005; U.S. patent application Ser. No. 11/094, 350, filed Mar. 30, 2005; U.S. patent application Ser. No. 11/155,996, filed Jun. 17, 2005; U.S. patent application Ser. No. 11/206,404, filed Aug. 18, 2005; U.S. patent application Ser. No. 11/321,504, filed Dec. 29, 2005; U.S. patent application Ser. No. 11/442,572, filed May 25, 2006; U.S. patent application Ser. No. 11/444,850, filed May 31, 2006; U.S. patent application Ser. No. 11/455,444, filed Jun. 19, 2006; and U.S. patent application Ser. No. 11/616,977, filed Dec. 28, 2006; all of which are hereby incorporated by reference.

The present system may include a flexible and user-friendly configurable controller based on (MPC) model based predictive control technology for use in an automotive control system that is implemented in an ECU (engine control unit). The MPC controller may be based on an optimization challenge involving an explicit solution of the optimization problem which supports applicability to control systems with relatively fast-sampling and with low computation power and memory. The system may offer a strong tool that allows decreasing significantly the development and calibration time of the control system. It may include an implementation of a general MPC algorithm as a template for the embedded ECU that may be configured by a calibration dataset. An advantage of such an approach is that it may allow many different controller configurations which can be achieved through simply modifying the calibration dataset. Changes of the core MPC algorithm implemented inside the template may be mitigated or avoided altogether.

The present system may be responsive to a need to decrease the time required for development and calibration of a control system for an automotive application. This may be achieved by designing and implementing a general template for MPC controller which can be parameterized by a calibration set. The calibration set may contain information about parameters for configuring the structure of the controller but also parameters for tuning the control performances. Parameters influencing the structure of the controller may include, for example, numbers of measured variables, set-points, constraints, actuators, and so on. Parameters influencing performances may include, for example, models of the controlled system, prediction horizon lengths, weighting matrices defining the control objectives and preferences of a resulting feedback control, covariance matrices for a state estimator, and so forth. Then if one would like to change the structure or tuning of the controller, it may be enough to modify the calibration dataset without modifying the MPC controller template. The template may be implemented in the ECU function block using, for instance, C programming language.

The calibration dataset may be generated off-line and stored in appropriate memory. In the case when a controller template is implemented in C programming language, the storage may be, for example, a header file. Having the template and calibration set, one may use an appropriate compiler to generate a target code for a target device, e.g., an ECU, where the target code is an instance of a configured MPC controller. The target code (MPC) may then be downloaded into the target device (ECU). Whenever one would like to change a configuration of the controller, i.e., a structure of the controller or performances, it may be sufficient to change the calibration dataset, re-compile the controller template with the updated calibration dataset to generate a new target code (MPC) and download the new target code into the target device (ECU). There appears to be no need with the present system to modify the MPC controller template which means a great savings in time. This may also mean less total time required for both calibration and controller development.

The present system may be further improved and the total calibration time may be further decreased when changes are only the part of the calibration dataset which influences performance of the control-loop. The structure of the controller may remain fixed. The present system may be extended so that the part of the calibration dataset containing information about MPC controller performances may be replaced on-line, e.g., via a run-time regime.

The system may further be extended so that one may be able to change the both parts of the calibration datasets, i.e., the part that defines the performances and the part that defines the structure of the controller in terms of a number of measured variables, set-points, constraints, actuators, and so forth.

The present system may be implemented in Simulink™ and Matlab™ which is regarded as a software tool for simulation and model-based design. The present algorithm may be implemented as user function or a set of user functions in a Simulink™ tool. A simulation scheme containing these functions may be a source for a target code generator.

FIG. 12*a* is a flow diagram of an automotive control development process. Step 11 may indicate the specification of functional requirements of an automotive control unit, such as specific fuel consumption (SFC), drivability, emissions, and so forth. After step 11, a steady-state calibration may be effected as indicated in step 12. From step 12, the flow of the process may continue on to step 13 which includes functional block development. A developed functional block may be subject to on-engine testing (via a rapid prototype (RP) system) at step 14. An evaluation of test results from step 14 may be provided at step 15, which may indicate whether the results are acceptable or not. If the results are not acceptable, then an iteration 20 back to step 13 for further functional block development may occur. Then the on-engine test 14 may occur on perhaps an improved functional block from step 13. Again, the results from on-engine testing may be evaluated at step 15. If the results are unacceptable, then looping back to the functional block development at step 13 for improvement may occur again. The iteration loop 20 may continue until results of on-engine testing (RP system) of the functional block are determined to be acceptable. If the results are acceptable at step 15, then functional specifications may be generated at step 16.

After generating functional specifications, a translation of the functions into an embedded ECU code may occur in a set of steps as delineated by a dashed rectangle 17 in FIG. 12*a*. Software specifications at step 18 may be generated from the functional specifications at step 16. The software specifications may then be coded into software at step 19. Testing of the resultant software from step 19 may occur at step 21. The time spent in software tasks in step 17, particularly at software coding in step 19, may be significant, as much as six or so months. After the software testing at step 21, the process may exit set 17 and go to functional testing at step 22. Step 16, set 17 of steps, and step 22 may be contained in a stage 53, delineated by a dashed rectangle, which may be regarded as a functional block stage of the development process. Stage 53 may be regarded as where a control functional block is integrated into the ECU software.

Subsequent to the functional testing at step 22, there may be a calibration at step 23. If the calibration at step 23 is not acceptable at evaluation step 24, then the calibration may be redone at step 23 via an iteration 28 until it becomes acceptable. Once the calibration is acceptable, then a vehicle validation may occur at step 25. However, if the validation does not occur, then the process may loop back along path 29 to the calibration step 23 and proceed back through evaluation step 24 and to validation step 25. The process may proceed to a certification step 26. If certification is not attained, then there may be loop 30 back to the calibration step 23. After proceeding through calibration 23, acceptance 24 and validation 25, then a return to certification step 26 may occur. Once a certification is achieved, the process may continue to step 27 for a release. In post-release 92, then a return to calibration 23 may occur via loop 44 for example to make improvements to the controller performance The process may proceed through calibration 23, acceptance 24, certification 26 and release 27. The iterative loops 28, 29, and 30 may occur until a release occurs at step 27. Alternatively, relative to each of these loops, a return to the functional block development 13 may occur. In other words, if a developed controller function is judged to be unsatisfactory at the time of calibration, certification or release, then it may return to the functional block development step 13 for further development and subsequent on-engine testing and functional specification generation at steps 14 and 16, respectively, along with an evaluation at step 15 and feedback at loop 20, and then eventually to software specification, coding and testing steps 18, 19 and 21, respectively, of set 17. Thus, a return to the functional block development step 13 may lead to a highly undesirable delay (e.g., perhaps greater than six months) in the automotive controller development cycle.

Figure 12B:
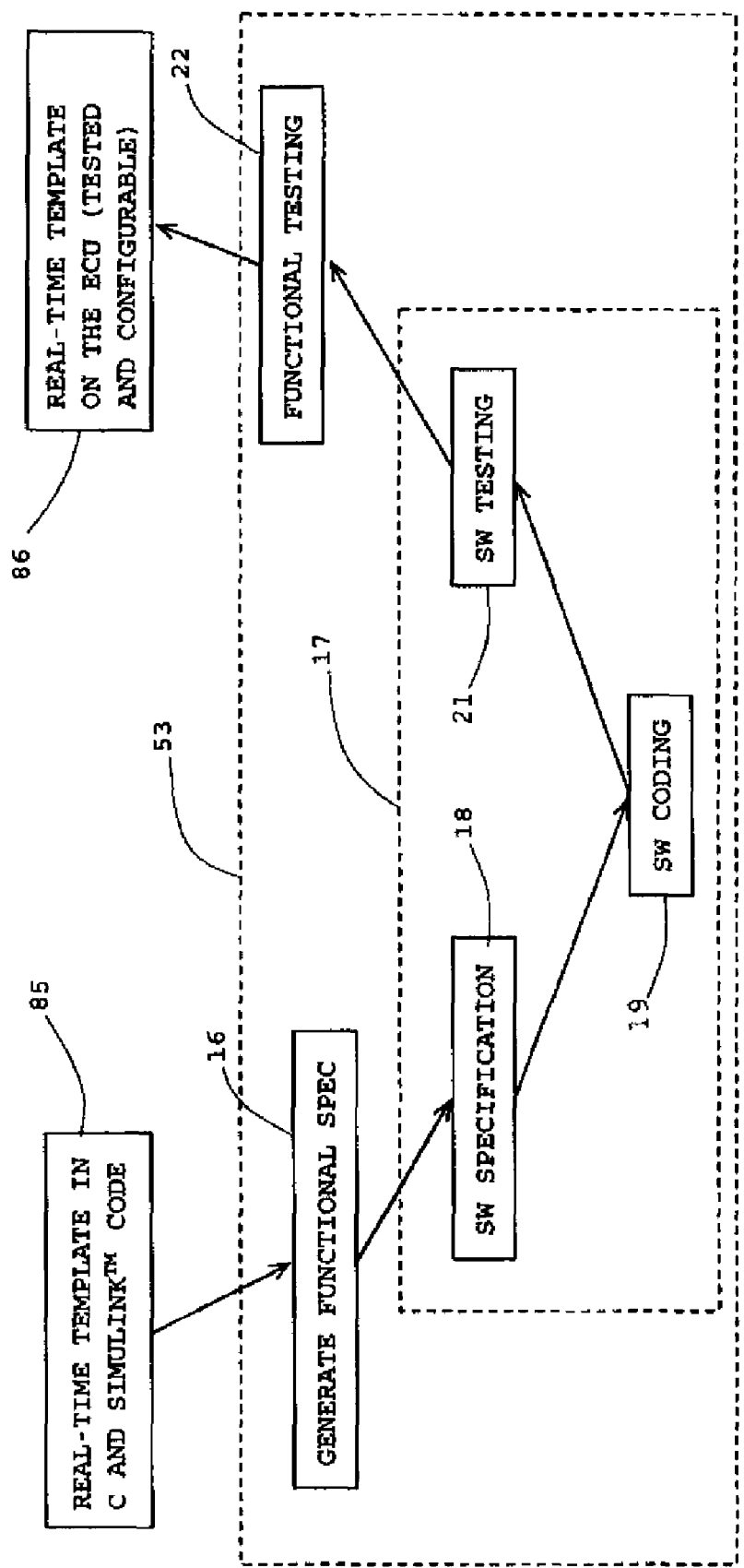
FIG. 12b is a diagram showing an integration of a real-time template.

FIG. 12*b* is a diagram showing an initial configuration of the functional block for the present system, which may involve an integration of a software template into the target embedded platform (ECU). At step 85, the present functional block real-time template may be in C and Simulink™ code. Then a functional specification may be generated at step 16. From there a software specification may be provided at step 18, and software coding and testing may be performed at steps 19 and 21, respectively, in the ECU. Functional testing at step 22 may occur. At step 86, the present functional block, tested and configurable, may be of a real-time template on the ECU.

Figure 12C:
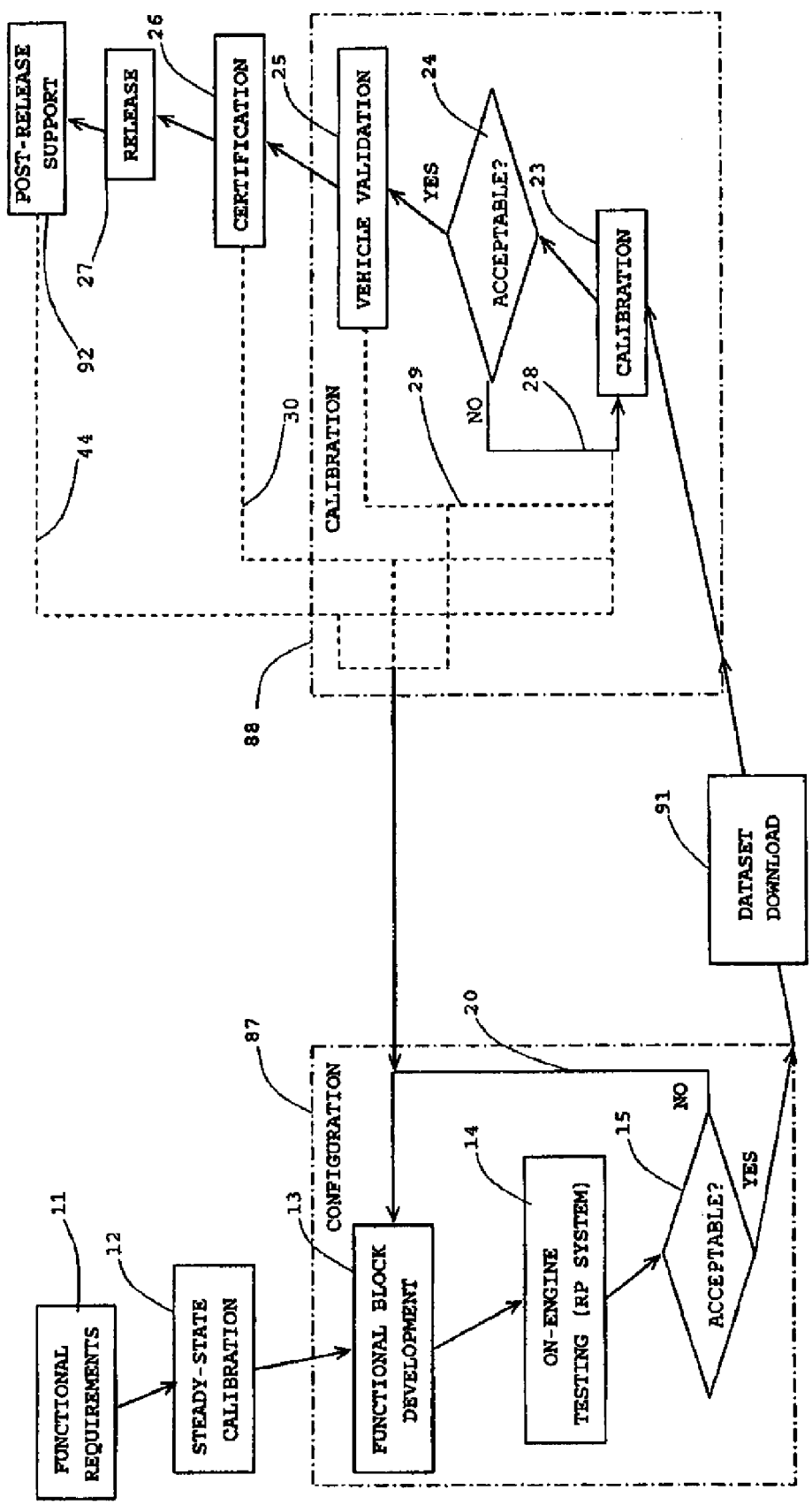
FIG. 12c is a diagram showing configuring and calibration of a controller with skipping controller software changes.

FIG. 12*c* is a diagram similar to that of FIG. 12*a* except that stage 53 is removed or bypassed. FIG. 12*c* shows a subsequent control design using the present system supporting modeling, functional block development and calibration. Following the integration of the real-time template, configuration and calibration of the controller may proceed via a population of the template without necessarily requiring ECU software changes. One may go from configuring the controller at the set 87 of steps to calibrating at the set of steps 88 while skipping stage 53 of FIG. 12*a*, for ECU software changes. The sets 87 and 88 are delineated by dashed rectangles. However, between the configuring set 87 and the calibrating set 88, there may be a dataset download step 91. Here, the dataset may be downloaded to the ECU.

Figure 12D:
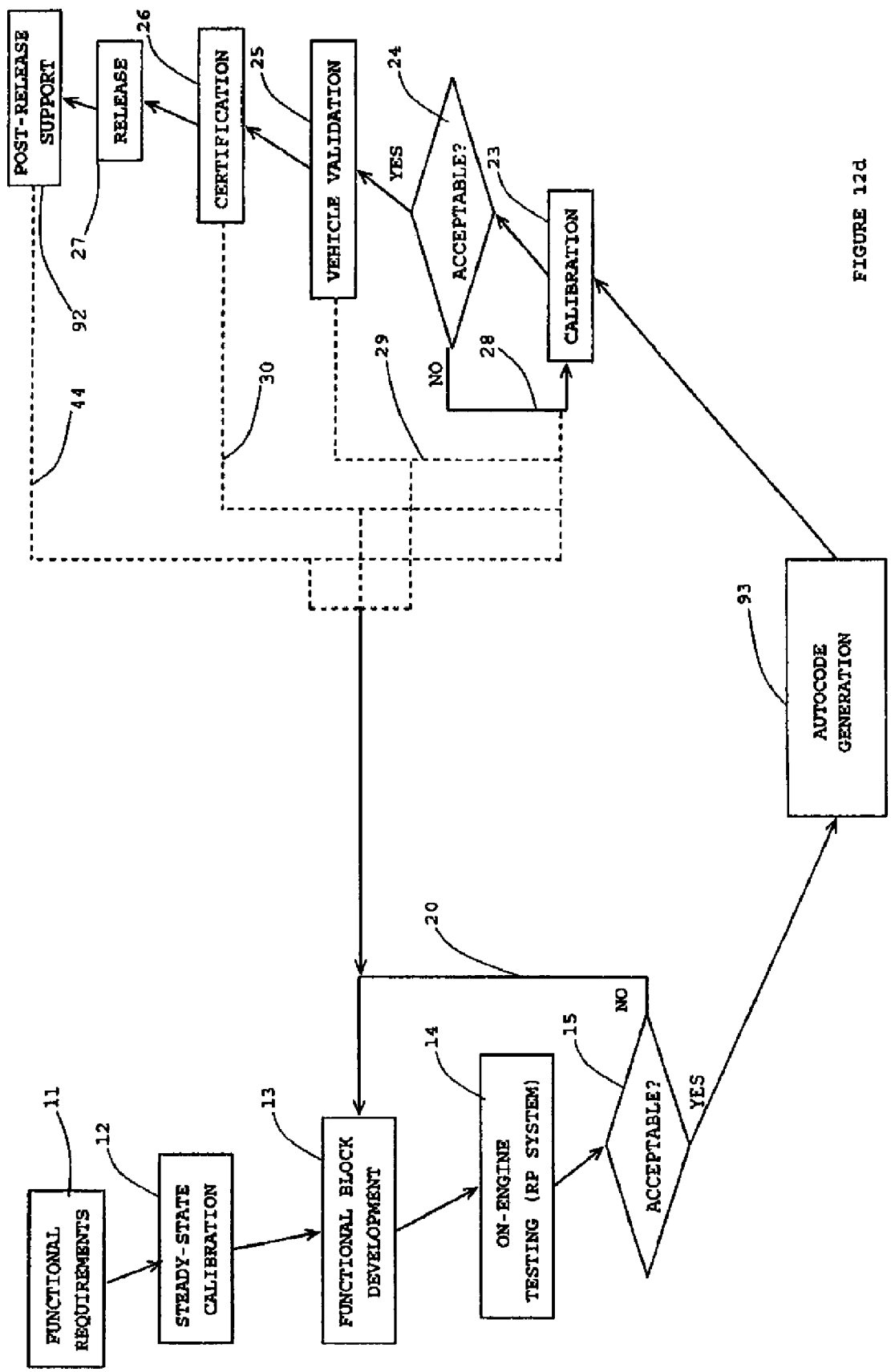
FIG. 12d is a diagram showing a compiling of a controller algorithm and dataset together.

FIG. 12*d* is similar to FIG. 12*a* except that block 53 is replaced with an autocode generation step as indicated by a block 93. In block 93, a controller algorithm and dataset may be compiled together. "Autocode generation" may be a term that includes some or all of the steps to generate a functional specification, software specification, software coding, software testing and functional testing. Other steps may be included. This Figure illustrates the approach where compiling the controller algorithm and dataset may be considered simultaneously. Sometimes this may be done from within an autocoding framework. Autocoding may refers to a process and tools which will take a high level code such as Matlab™ or Simulink™ and automatically convert it to embedded code on an ECU.

FIG. 13 is a diagram of a previous control functional block 32 in an automotive ECU 31 pertinent to the diagram of FIG. 12*a*. A significant aspect of ECU 31 may be regarded as being in the control functional block 32 which incorporates an algorithm running in real-time. Changes to the algorithm in control functional block 32 may require a return to the functional block development stage 13 of the development process shown in FIG. 12*a*, plus subsequent steps including the laborious set 17 of steps.

Figure 14:
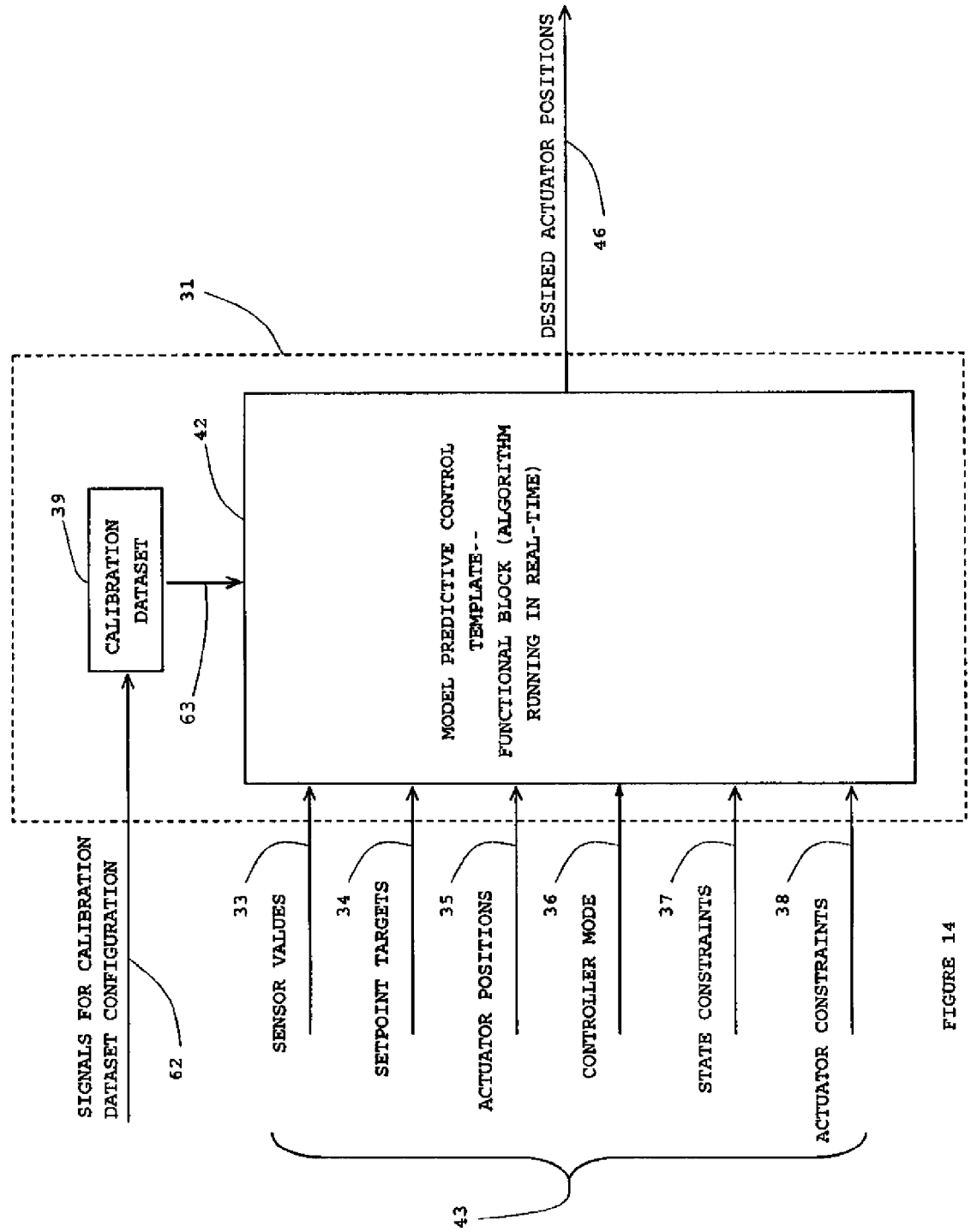
FIG. 14 is a diagram similar to the diagram of FIG. 13 except a model predictive control template functional block of the present invention is substituted in place of the control functional block of FIG. 13.

FIG. 14 is similar to the diagram of FIG. 13 except a control functional block 42 having an MPC template may be substituted in place of the control functional block 32. The MPC replacement may be for one or more subcontrollers 76, 77 shown in FIG. 16. A feature of the present block 42 is that many controller configurations may be achieved through modifying the calibration dataset 39 with signals 62 for a calibration dataset configuration. The signals are not necessarily of real-time but may be entered just at a calibration time.

Changes to the algorithm in the functional block 42 do not necessarily require a return to the functional block development step 13, plus subsequent steps including the laborious set 17 of steps, of the process in FIG. 12*a* as may be required with algorithm changes in the functional block 32. Algorithm changes with functional block 42 may result in significant development time savings over changes made with block 32 in place.

Inputs 43 to block 42 may include some values read from other parts of the ECU 31 in real-time code. Inputs 43 may include sensor values 33, setpoint targets 34, actuator positions 35, a controller mode 36, state constraints 37 and actuator constraints 38. The structure of the real-time controller which is implemented on a RP system or ECU may be configured via data and consist of various inputs and outputs. Sensor values 33 may include those of sensors such as MAP, MAF, EGR flow, turbospeed, NOx, engine speed, fuel quantity, and so forth. Setpoint targets 34 may include those of setpoints such as MAP, EGR flow, NOx, and so forth. Constraints 38 may include those such as turbospeed limit, boost pressure limit, AFR limit, and so forth.

Also input to the control functional block 42 may be a calibration dataset 39. The dataset 39 may be defined at calibration time and stored in a flash memory of the ECU 31. An output 46 of block 42 may provide desired actuator positions. The outputs 46 may include those for actuators of VTG/VNT vane, EGR valve, VVA, and so forth.

Several stages may be resorted to for implementing the present system. A one-time software change may be effected to integrate an MPC template in the functional block 42 into a rapid prototyping system and ECU. Then subsequent configuration and calibration of the present functional block may be performed using a PC-based present function block design suite to enable one to configure and calibrate control oriented models and afterwards to configure and design optimal multivariable controllers.

Figure 15:
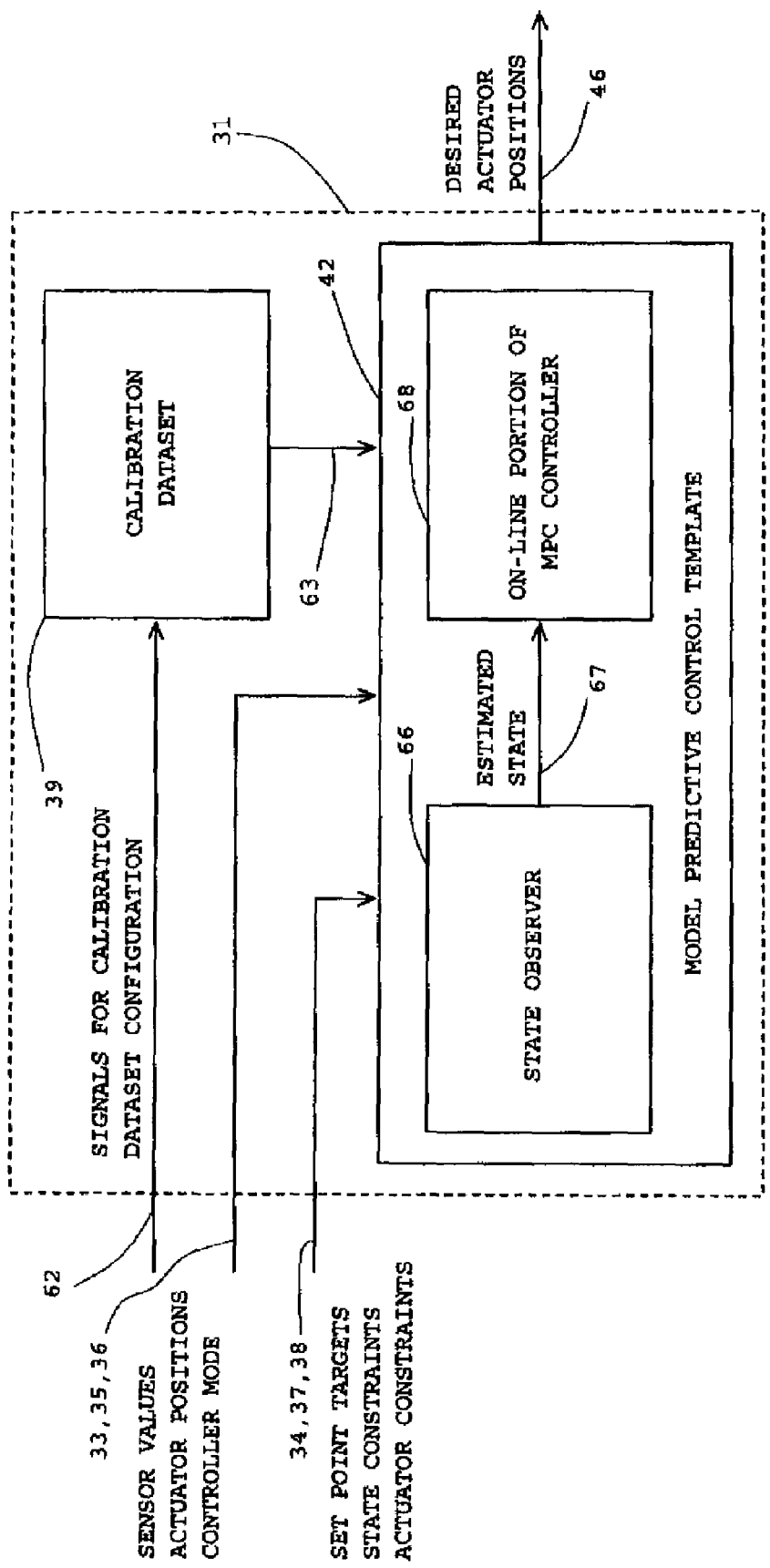
FIG. 15 is a diagram of an internal structure of the model predictive control controller in FIG. 14.

FIG. 15 is a diagram of the internal structure of the MPC controller block 42 portions and interactions with other components of the control system. Calibration dataset 39 and function block 42 may be part of the internal structure. As also noted in FIG. 14, there may be the signals 62 for calibration dataset 39 configuration. Calibration dataset 39 may output signals 63 which include parameter defining structures and parameter defining performances to function block 42. An output 46 from block 42 may include desired actuator positions. Function block 42 may include the MPC controller template. The template may have a state observer 66 and an on-line portion of the MPC controller as indicated by block 68. The state observer 66 may receive inputs 34, 37 and 38 (i.e., set point targets, state constraints and actuator constraints) and provide an estimated state 67 to the on-line portion of MPC controller in block 68. Also block 42 may receive inputs 33, 35 and 36 (i.e., sensor values, actuator positions and controller mode). The on-line portion of controller at block 68 may be provided reconfiguration signals 63 from the calibration dataset 39. The on-line portion of the controller may be a model predictive controller (MPC) implemented in any of the approaches discussed above (1) traditional multiparameteric programming, (2) graph algorithm, or (3) primal-dual feasibility algorithm.

Figure 16:
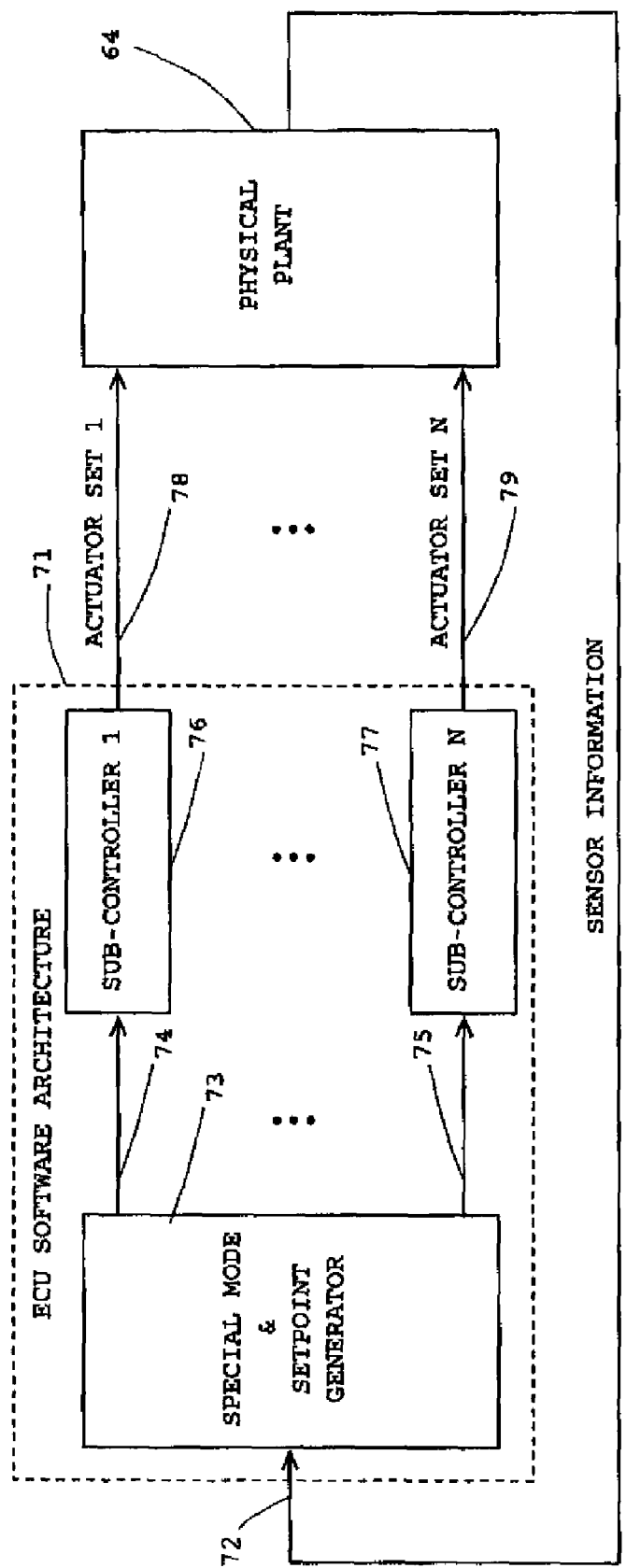
FIG. 16 is a diagram of engine control unit software architecture.

FIG. 16 is a diagram of an ECU software architecture 71. Sensor information 72 may be input to a special mode and setpoint generator 73. A number N outputs one through N, 74, 75 from generator 73 may go to a number N of sub-controllers one through N, 76, 77, respectively. A number N outputs 78, 79 from N sub-controllers 76, 77 may go as actuator sets 1 through N to a physical plant 64. The physical plant 64, for example, may be an automotive engine. Physical plant 64 may have an output which may provide the sensor information 72 to generator 73. Examples of the actuator sets 78, 79 may include fuel injection control, engine brake control, after-treatment control, EGR control, turbocharger control or a combined EGR and turbocharger control, and so forth. The particular sub-controller may be either independent or may interact with other sub-controllers.

FIG. 17 is a diagram of a previous approach for development of new or modified control functions for block 32. Step 51 may incorporate development and testing functional blocks in a rapid prototyping (RP) stage. A next step 52 may be for generating a calibration dataset. A stage 53 having steps 16 and 22, and set 17 of steps 18, 19 and 21, may be necessary for software coding. Step 16 may be a generating of a functional specification. Set 17 of steps 53 may include software specification 18, coding 19 and testing 21 as indicated in FIG. 12a. Achieving the steps of set 17 might require about six months or so of effort. Whether the effort takes six months or not, the time period for this set 17 may be enormously large relative to the other steps of the system. The next step 22 may include functional testing.

A calibration dataset 39 may be downloaded to functional block 32 of the ECU 31 as indicated in step 57. Then in step 58, there may be an iteration on calibration while working on the engine. At an evaluation step 59, a check may be done to determine whether the calibration is acceptable. If not, then an iteration 61 may be fed back to step 51 where the process of steps 51, 52, 16, 17, 22, 57 and 58 may be repeated resulting in another large amount of spent time. The iteration 61 may be repeated until the functional block and calibration are deemed acceptable at step 59.

Figure 18A:
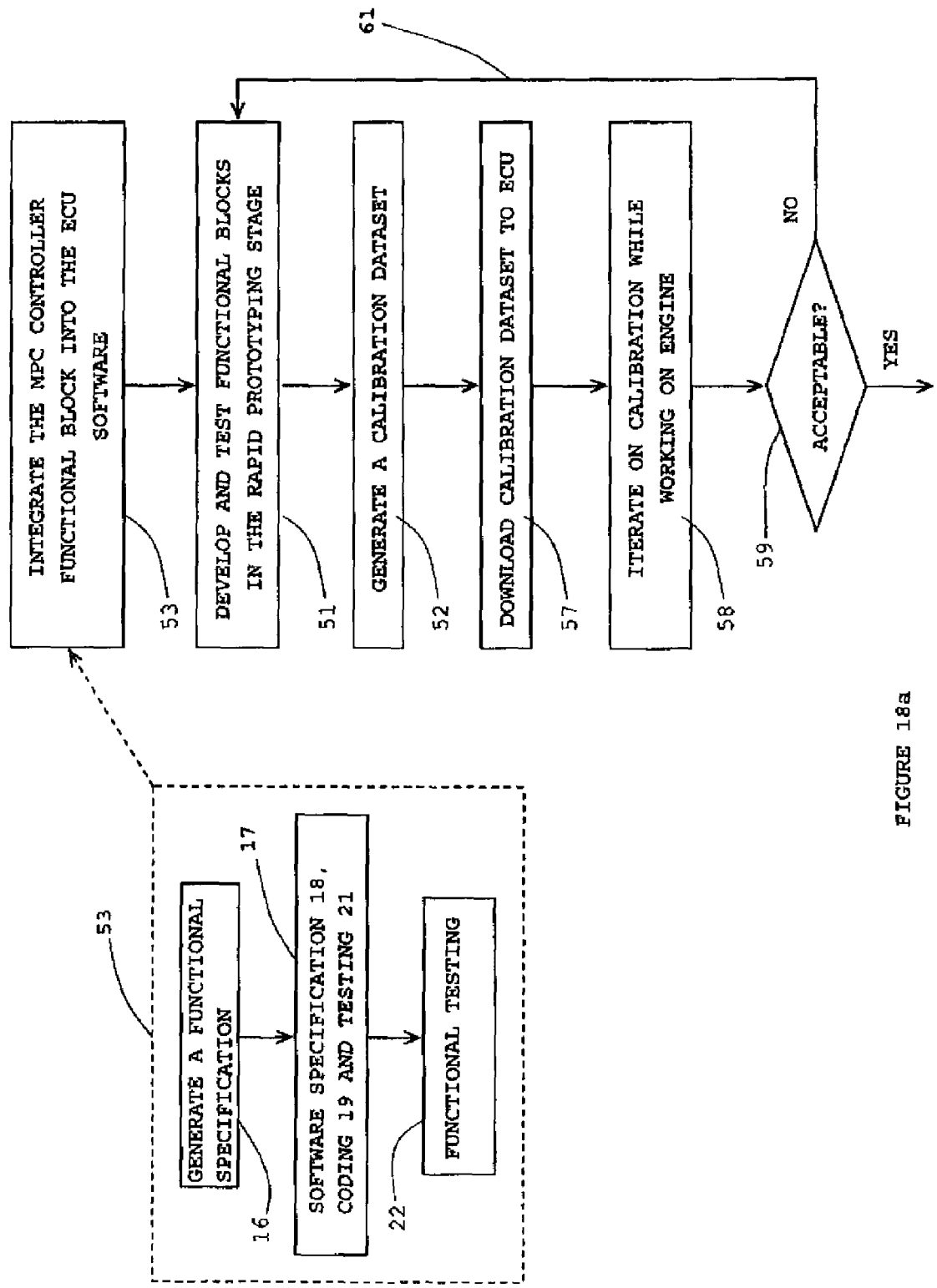
FIG. 18a is a diagram of a developmental approach of the present invention for a control functional block.

FIG. 18a reveals the present approach for obtaining new control functions being time-saving particularly for iteration 61. The laborious software stage 53 may be circumvented by iteration 61. One key aspect of the present system is that stage 53 may involve integrating the MPC controller template functional block 42 into the ECU 31 software. The MPC controller may be configurable through the calibration dataset 39. This stage 53 may involve generating a functional specification at step 16, steps of software specification 18, coding 19 and testing 21 (as shown in FIG. 12b) at set 17 and then functional testing at step 22. As noted herein, set 17 of steps may take about six or so months. One may continue on from stage 53 to step 51 where there are developing and testing functional blocks in the rapid prototyping stage. Then in the following step 52, there may be a generating of the calibration dataset 39. The calibration dataset 39 may be downloaded, as indicated in step 57, to ECU 31 having the MPC controller template in function block 42.

After step 57, a step 58 may indicate iterating on calibration while working on the physical plant such as an engine. At step 59, an outcome of step 58 may be evaluated as acceptable or not acceptable. Another key aspect of the present system is that if the outcome of step 58 is evaluated as unacceptable, then iteration 61 may proceed directly to step 51 in that there is not necessarily a need to repeat stage 53 (like the approach of FIG. 17). The present sequence may go from step 51 through steps 52, 57 and 58, and to step 59 where the outcome of step 58 may be evaluated again. Iteration 61 appears very much quicker than the iteration in FIG. 17 since in FIG. 18a stage 53 of the sequence of steps 16, 17 and 22 is bypassed, thereby avoiding a repeat of the possible many month process of set 17 steps having software specification 18, coding 19 and testing 21. Thus the lengthy software coding step 19 (noted in FIG. 12b) of set 17 may be moved out of the iteration loop 61 after the just one-time initial coding, or coding change. In other words, the present approach may permit movement of the coding step 19 (including the other steps in set 17 and stage 53) upstream from step 51 and entry of iteration loop 61 in the overall software development process.

Figure 18B:
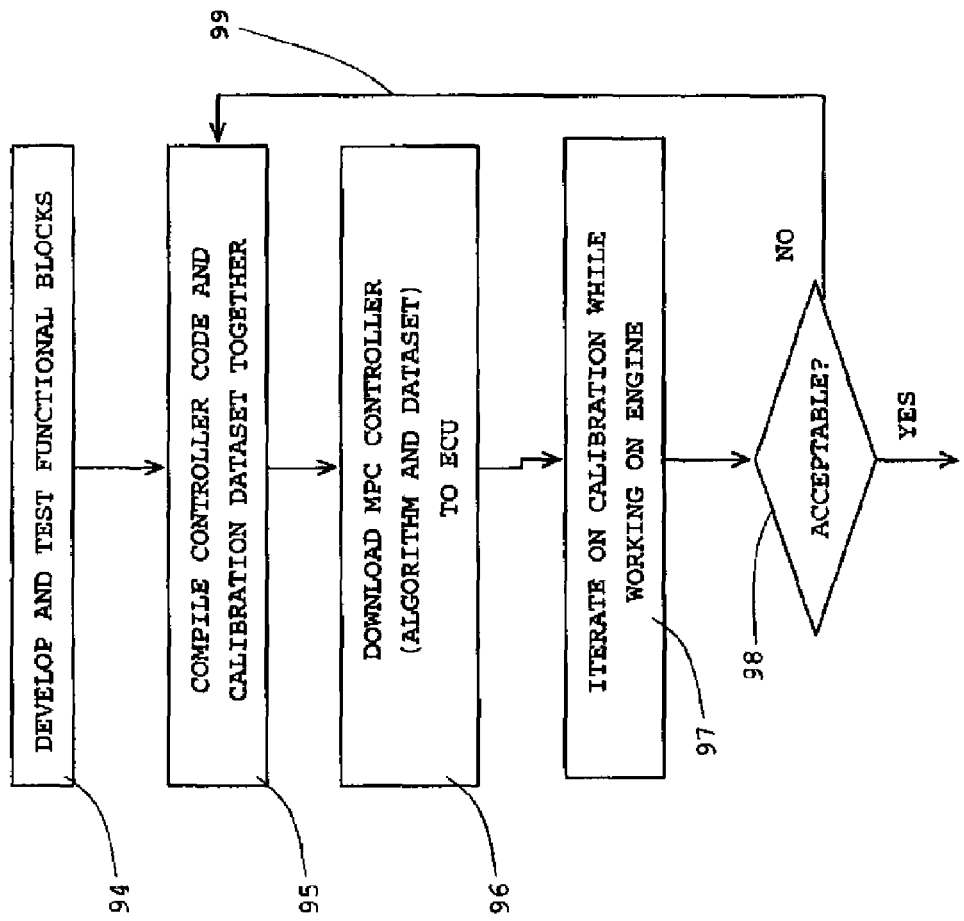
FIG. 18b is a diagram of a developmental approach of the present invention that compiles controller code and a calibration dataset together.

FIG. 18b is a diagram of a developmental approach of the present invention that compiles a controller algorithm and a dataset together. A step 94 may include developing and testing functional blocks. Then a step 95 may occur for compiling controller code and a calibration dataset together. Downloading an MPC controller (algorithm and dataset) to an ECU may be step 96. Step 97 may include iterating on calibration while working on the engine. Then a question as to whether the result of this approach is acceptable at step 98. If not, an iteration 99 may return the approach back to step 95 to repeat steps 95 through 98. This iteration may continue indefinitely until there an acceptance at step 98.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A configurable control system, comprising:
    a control unit;
    a generalized model predictive control template;
    a calibration dataset;
    wherein the generalized model predictive control template is configurable into a specific model predictive controller configuration by referencing the calibration dataset; and
    wherein the control unit implements the specific model predictive controller configuration by referencing the generalized model predictive control template in conjunction with the calibration dataset.

2. The configurable controller of claim 1, wherein the generalized model predictive control template is parameterized by the calibration dataset.

3. The configurable controller of claim 1, wherein a structure of the specific model predictive controller configuration is defined, at least in part, by the calibration dataset.

4. The configurable controller of claim 3, wherein the calibration dataset influences the structure of the specific model predictive controller configuration by defining, at least in part, one or more of a number of measured variables, one or more set-points, one or more constraints, and/or one or more actuators.

5. The configurable controller of claim 3, wherein the calibration dataset influences one or more tuning parameters of the specific model predictive controller configuration.

6. The configurable controller of claim 5, wherein the one or more tuning parameters define at least in part of one or more models, one or more prediction horizon lengths, one or more weighting matrices defining one or more control objectives and/or preferences of a feedback control path, and/or one or more tuning parameters for a state estimator.

7. The configurable controller of claim 1, wherein the calibration dataset is generated off-line and stored in a memory of the configurable control system.

8. The configurable controller of claim 1, further comprising a compiler for compiling the generalized model predictive control template together with the calibration dataset to generate a target code for a target control device, where the target code is an instance of the specific model predictive controller configuration.

9. The configurable controller of claim 8, wherein the target control device is a controller of a vehicle.

10. The configurable controller of claim 8, wherein the target control device is an engine control unit of a vehicle.

11. A method for generating a generalized model predictive controller configuration for an electronic control unit of a vehicle, the method comprising:
    providing a generalized model predictive control template;
    providing a calibration dataset;
    wherein the generalized model predictive control template is configurable into a specific model predictive controller configuration by referencing the calibration dataset;
    populating the generalized model predictive control template with the calibration dataset to realize a particular model predictive controller configuration;
    downloading the particular model predictive controller configuration to an electronic control unit of a vehicle.

12. The method of claim 11, further comprising testing the electronic control unit.

13. The method of claim 12 further comprising:
    after testing the electronic control unit, providing a new calibration dataset;
    populating the generalized model predictive control template with the new calibration dataset to realize a new particular model predictive controller configuration;
    downloading the new particular model predictive controller configuration to the electronic control unit; and
    testing the electronic control unit.

14. The method of claim 11, wherein the calibration dataset is generated using a design suite that is not executed on the electronic control unit.

15. The method of claim 14, wherein the design suite includes a simulator.

16. The method of claim 14, wherein the design suite has access to a rapid prototyping system (RP system).

17. A method for generating a model predictive controller configuration for an electronic control unit of a vehicle, the method comprising:
    providing a generalized model predictive control template;
    developing one or more functional blocks, the one or more function blocks defining, at least in part, a generalized model predictive control template, wherein the generalized model predictive control template is configurable into a specific model predictive controller configuration when compiled with a calibration dataset;
    compiling the generalized model predictive control template and the calibration dataset together to realize a particular model predictive controller configuration;
    downloading the particular model predictive controller configuration to an electronic control unit; and
    testing the electronic control unit to determine if it provides acceptable control, and if not, returning to the developing step.

18. The method of claim 17, wherein the testing step includes calibrating the particular model predictive controller configuration.

19. The method of claim 17, wherein the testing step is performed on a rapid prototyping system (RP system).

20. The method of claim 17, wherein the testing step is performed in an actual electronic control unit.

* * * * *